United States Patent
Cai et al.

(10) Patent No.: US 10,620,654 B2
(45) Date of Patent: *Apr. 14, 2020

(54) ALTERNATINGLY-SWITCHED PARALLEL CIRCUIT, INTEGRATED POWER MODULE AND INTEGRATED POWER PACKAGE

(71) Applicant: Delta Electronics (Shanghai) CO., LTD, Shanghai (CN)

(72) Inventors: Chaofeng Cai, Shanghai (CN); Le Liang, Shanghai (CN); Yan Chen, Shanghai (CN); Xiaoni Xin, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/231,969

(22) Filed: Dec. 25, 2018

(65) Prior Publication Data

US 2019/0146541 A1 May 16, 2019

Related U.S. Application Data

(63) Continuation-in-part of application No. 15/482,982, filed on Apr. 10, 2017, now Pat. No. 10,198,020.

(30) Foreign Application Priority Data

Aug. 31, 2016 (CN) .......................... 2016 1 0783952

(51) Int. Cl.
*G05F 3/16* (2006.01)
*G05F 3/20* (2006.01)
(Continued)

(52) U.S. Cl.
CPC ............ *G05F 3/20* (2013.01); *H02M 1/4233* (2013.01); *H02M 3/1582* (2013.01);
(Continued)

(58) Field of Classification Search
CPC ........................................................ G05F 3/20
(Continued)

(56) References Cited

U.S. PATENT DOCUMENTS 5,477,132 A * 12/1995 Canter .................. B64G 1/428
320/101
6,023,154 A * 2/2000 Martinez ............. H02M 3/1584
323/272
(Continued)

FOREIGN PATENT DOCUMENTS

CN 101719487 A 6/2010
CN 101764162 A 6/2010
(Continued)

OTHER PUBLICATIONS

The CN1OA issued Mar. 4, 2019 by the CNIPA.

*Primary Examiner* — Ryan Jager
(74) *Attorney, Agent, or Firm* — Yunling Ren

(57) ABSTRACT

The present disclosure provides an alternatingly-switched parallel circuit, an integrated power module and an integrated power package. The alternatingly-switched parallel circuit includes a first bridge arm and a second bridge arm at least partly formed in a chip containing a plurality of first cell groups and a plurality of second cell groups The plurality of first cell groups are configured to form the first upper bridge-arm switch and the plurality of second cell groups are configured to form the second upper bridge-arm switch, or the plurality of first cell groups are configured to form the first lower bridge-arm switch and the plurality of second cell groups are configured to form the second lower bridge-arm switch. The plurality of first cell groups and the plurality of second cell groups are switched on and off alternatingly.

20 Claims, 39 Drawing Sheets

(51) Int. Cl.
*H02M 1/42* (2007.01)
*H02M 3/158* (2006.01)
*H02M 3/335* (2006.01)
*H02M 1/00* (2006.01)

(52) U.S. Cl.
CPC ..... *H02M 3/1584* (2013.01); *H02M 3/33584* (2013.01); *H02M 2001/0048* (2013.01); *H02M 2001/0058* (2013.01); *H02M 2003/1586* (2013.01)

(58) Field of Classification Search
USPC ........................................................ 327/540
See application file for complete search history.

(56) References Cited

U.S. PATENT DOCUMENTS

| | | | | |
|---|---|---|---|---|
| 6,414,469 | B1* | 7/2002 | Zhou | G05F 1/62 323/272 |
| 6,534,960 | B1* | 3/2003 | Wells | H02M 3/1584 323/222 |
| 6,577,109 | B2* | 6/2003 | Dancy | H02M 3/1584 323/225 |
| 8,188,720 | B2* | 5/2012 | Kim | H02M 3/158 323/222 |
| 8,432,138 | B2* | 4/2013 | Chen | H02M 1/4233 323/207 |
| 9,570,973 | B2* | 2/2017 | Chen | H02M 1/4208 |
| 2004/0212021 | A1* | 10/2004 | Shimizu | H01L 27/088 257/375 |
| 2008/0019158 | A1* | 1/2008 | Wu | H02M 3/1584 363/44 |
| 2008/0054874 | A1* | 3/2008 | Chandrasekaran | H01F 37/00 323/362 |
| 2008/0084717 | A1* | 4/2008 | Wu | H02M 3/1584 363/44 |
| 2008/0119022 | A1* | 5/2008 | Lojek | H01L 27/115 438/266 |
| 2008/0129260 | A1* | 6/2008 | Abu Qahouq | H02M 3/1584 323/272 |
| 2008/0157742 | A1* | 7/2008 | Martin | H02M 3/1584 323/284 |
| 2008/0157743 | A1* | 7/2008 | Martin | H02M 3/1584 323/284 |
| 2009/0108821 | A1* | 4/2009 | Standing | H02M 3/1584 323/272 |
| 2009/0174262 | A1* | 7/2009 | Martin | H02M 3/157 307/82 |
| 2009/0230899 | A1* | 9/2009 | Arimura | H02M 3/1582 318/400.01 |
| 2011/0149622 | A1* | 6/2011 | Lin | H02M 1/4208 363/124 |
| 2011/0169474 | A1* | 7/2011 | Cuk | H02M 3/158 323/311 |
| 2011/0175591 | A1* | 7/2011 | Cuk | H02M 3/07 323/311 |
| 2013/0027009 | A1* | 1/2013 | Tang | H02M 3/1584 323/271 |
| 2013/0070504 | A1* | 3/2013 | Xu | H02M 7/5388 363/132 |
| 2013/0076135 | A1* | 3/2013 | Zhu | H02M 3/1584 307/43 |
| 2014/0057684 | A1* | 2/2014 | Khlat | H04W 52/0209 455/574 |
| 2014/0062446 | A1* | 3/2014 | Ikriannikov | H02M 1/14 323/304 |
| 2014/0206162 | A1* | 7/2014 | Eguchi | H01L 29/66712 438/268 |
| 2014/0266113 | A1* | 9/2014 | Zuniga | H02M 1/088 323/282 |
| 2015/0254011 | A1 | 9/2015 | Ueki | |
| 2016/0043624 | A1* | 2/2016 | Jarvinen | H02M 1/084 323/271 |
| 2016/0261184 | A1* | 9/2016 | Chen | H02M 3/1584 |
| 2017/0069712 | A1* | 3/2017 | Schustereder | C23C 14/48 |
| 2017/0294435 | A1* | 10/2017 | Rahimo | H01L 29/7404 |
| 2017/0324326 | A1* | 11/2017 | Liu | H02M 1/08 |
| 2017/0338731 | A1* | 11/2017 | Zuniga | H02M 1/088 |
| 2017/0365683 | A1* | 12/2017 | Blanchard | H01L 29/7813 |
| 2017/0373001 | A1* | 12/2017 | Tailliet | H01L 21/76895 |
| 2018/0005959 | A1* | 1/2018 | Wang | H01L 21/265 |

FOREIGN PATENT DOCUMENTS

| | | |
|---|---|---|
| CN | 201877431 U | 6/2011 |
| CN | 103325838 A | 9/2013 |
| CN | 103368371 A | 10/2013 |
| CN | 103731034 A | 4/2014 |
| CN | 104183634 A | 12/2014 |
| CN | 104242666 A | 12/2014 |
| CN | 105553007 A | 5/2016 |

\* cited by examiner

ALTERNATINGLY-SWITCHED PARALLEL CIRCUIT, INTEGRATED POWER MODULE AND INTEGRATED POWER PACKAGE

CROSS REFERENCE

This application is a Continuation-In-Part (CIP) application of U.S. application Ser. No. 15/482,982, and is based upon and claims priority to Chinese Patent Application No. 201610783952.4, filed on Aug. 31, 2016, the entire contents thereof are incorporated herein by reference.

TECHNICAL FIELD

The present disclosure relates to electrical and electronic technology, and more particularly, to an alternatingly-switched parallel circuit, an integrated power module and an integrated power package.

BACKGROUND

Power semiconductor devices are core components of energy conversion and system power supply equipment. The performances of the power semiconductor devices directly affect the overall efficiency of the industrial applications, especially for power supply configurations of processors, communication systems and data centers in a large number of electronic products. In all kinds of power supply circuits for processors, in order to meet the requirement of a long system running time, it poses a great challenge to the entire circuit in terms of efficiency and power consumption. On the other hand, high power consumption also means temperature rise and waste of power, which threatens reliable operation of the processor system in a long run, and causes additional cost for heat dissipation for the circuit.

Presently, in power supply circuit of a server system, a data center or other types of processors, the rapid improvement of the performance of the core processor and the enhanced integration of the core processor impose high requirements on the power density and efficiency of the power supply. In such power supply circuits, since the supply voltage is low for the load such as the processor, there is a high conduction loss for the circuit which operates under a low voltage and a large current for a long time. In this case, the conduction loss includes not only the loss on the power devices, but also the loss on the metal connection in the circuit system. Accordingly, there is a demand for reducing the conduction loss in design of the devices and the circuits.

As shown in FIG. 1 is a conventional topology of a power source, which includes a power switch Q1, a power switch Q2, an input power $V_{IN}$, an inductor L and a filtering capacitor $C_O$. An ideal power package does not have any stray parameters. While in practice, the power package has package stray parameters Z1 and Z2 generated by an interconnect metal layer (RDL), an external pin, a package interconnection, a system board interconnection. When there is a large current flowing in the circuit, the conduction loss will be generated on Q1 and Q2 as well as on the stray parameters Z1 and Z2. With the supply voltage of the load being decreased, the voltage levels of the power devices Q1 and Q2 in the circuit are decreased, and the conduction performance of the power devices is improved, while the stray parameters Z1 and Z2 due to all of the wires and metal connections in the circuit bring an increasingly high proportion of conduction loss.

For example, for a typical 15V power device, a conduction impedance of a metal layer of the device is up to 20% of the entire impedance. In order to improve power density and efficiency, how to reduce conduction loss of other parts than the semiconductor itself and how to fully utilize the interconnect conduction path (including a metal interconnection layer inside the chip, package connection, pins and metal connection of the system board) becomes an important topic.

In order to reduce conduction loss, a highly efficient optimization method is to take full utilization of all the metal connection resources, and make current flowing evenly in time domain. As shown in FIG. 2(a) is a typical circuit in which the conduction paths are conducted in a discontinuous way, delivering power cycle by cycle. In contrast FIG. 2(b) shows ideal evenly conducted current in which power is transferred continuously through the circuit. Although the power transferred through the two circuits is of the same amount, the conduction loss in the discontinuous conduction mode of FIG. 2(a) is significantly higher than the continuous mode in FIG. 2(b).

Therefore, there is a demand for a novel alternatingly-switched parallel circuit, a novel integrated power module and a novel integrated power package.

The above information disclosed in the BACKGROUND is merely for better understanding of the context of the present disclosure, and may include contents that do not constitute the known prior art of those skilled in the art.

SUMMARY

The present disclosure provides an alternatingly-switched parallel circuit at least partly formed in a power chip, an integrated power module and an integrated power package, which are capable of reducing loss of the metal layers of the power device by integrating the chip, reducing the overall loss of the power supply circuit and improving the system efficiency.

The other characteristics and advantages of the present disclosure may become apparent from the following detailed description, or partly learned from the practice of the present disclosure.

According to one aspect of the present disclosure, there is provided an alternatingly-switched parallel circuit including a first bridge arm and a second bridge arm, wherein the first bridge arm includes: a first upper bridge-arm switch including a first terminal, a second terminal and a control terminal; and a first lower bridge-arm switch including a first terminal, a second terminal and a control terminal; wherein the second terminal of the first upper bridge-arm switch is electrically connected to the first terminal of the first lower bridge-arm switch; the second bridge arm includes: a second upper bridge-arm switch including a first terminal, a second terminal and a control terminal; and a second lower bridge-arm switch including a first terminal, a second terminal and a control terminal; wherein the second terminal of the second upper bridge-arm switch is electrically connected to the first terminal of the second lower bridge-arm switch; wherein the first bridge arm and the second bridge arm are at least partly formed in a chip containing a plurality of first cell groups and a plurality of second cell groups; wherein the plurality of first cell groups are configured to form the first upper bridge-arm switch of the first bridge arm and the plurality of second cell groups are configured to form the second upper bridge-arm switch of the second bridge arm, or the plurality of first cell groups are configured to form the first lower bridge-arm switch of the first bridge arm and the plurality of second cell groups are configured to form the second lower bridge-arm switch of the second bridge arm; and the plurality of first cell groups and the plurality of second cell groups are switched on and off alternatingly.

According to an aspect of the present disclosure, there is provided an integrated power module, which is applied in an alternatingly-switched parallel circuit, including a first bridge arm and a second bridge arm, wherein the first bridge arm includes: a first upper bridge-arm switch including a first terminal, a second terminal and a control terminal; and a first lower bridge-arm switch including a first terminal, a second terminal and a control terminal; a first electrode electrically connected to the first terminal of the first upper bridge-arm switch; a second electrode electrically connected to the second terminal of the first lower bridge-arm switch; and a third electrode electrically connected to the second terminal of the first upper bridge-arm switch and the first terminal of the first lower bridge-arm switch; the second bridge arm includes: a second upper bridge-arm switch including a first terminal, a second terminal and a control terminal, the first electrode being electrically connected to the first terminal of the second upper bridge-arm switch; a second lower bridge-arm switch including a first terminal, a second terminal and a control terminal, the second electrode being electrically connected to the second terminal of the second lower bridge-arm switch; and a fourth electrode electrically connected to the second terminal of the second upper bridge-arm switch and the first terminal of the second lower bridge-arm switch; the integrated power module further includes: a first inductor including a first terminal and a second terminal, the first terminal of the first inductor being electrically connected to the third electrode; and a second inductor including a first terminal and a second terminal, the first terminal of the second inductor being electrically connected to the fourth electrode; wherein the second terminal of the first inductor is electrically connected to the second terminal of the second inductor; the first upper bridge-arm switch of the first bridge arm and the second upper bridge-arm switch of the second bridge arm and/or the first lower bridge-arm switch of the first bridge arm and the second lower bridge-arm switch of the second bridge arm are formed in a chip.

According to an aspect of the present disclosure, there is provided an integrated power package, which is applied in a power circuit including a first bridge arm and a second bridge arm, the first bridge arm including a first upper bridge-arm switch and a first lower bridge-arm switch, the second bridge arm including a second upper bridge-arm switch and a second lower bridge-arm switch, wherein the integrated power package includes a first switch and a second switch, the first switch and second switch are formed in a chip, and the chip contains a plurality of first cell groups and a plurality of second cell groups; wherein the plurality of first cell groups are configured to form the first switch as the first upper bridge-arm switch of the first bridge and the plurality of second cell groups are configured to form the second switch as the second upper bridge-arm switch of the second bridge arm, or the plurality of first cell groups are configured to form the first switch as the first lower bridge-arm switch of the first bridge arm, the plurality of second cell groups are configured to form the second switch as the second lower bridge-arm switch of the second bridge arm; and the plurality of first cell groups and the plurality of second cell groups are switched on and off alternatingly.

According to another aspect of the present disclosure, there is provided an alternatingly-switched parallel circuit comprising a first bridge arm and a second bridge arm, wherein the first bridge arm comprises: a first upper bridge-arm switch comprising a first terminal, a second terminal and a control terminal; and a first lower bridge-arm switch comprising a first terminal, a second terminal and a control terminal; wherein the second terminal of the first upper bridge-arm switch is electrically connected to the first terminal of the first lower bridge-arm switch; the second bridge arm comprises: a second upper bridge-arm switch comprising a first terminal a second terminal and a control terminal; and a second lower bridge-arm switch comprising a first terminal, a second terminal and a control terminal; wherein the second terminal of the second upper bridge-arm switch is electrically connected to the first terminal of the second lower bridge-arm switch; wherein the first bridge arm and the second bridge arm are at least partly formed in a chip including a plurality of first cell groups and a plurality of second cell groups, wherein the plurality of first cell groups are configured to form one of the first upper bridge-arm switch of the first bridge arm and the first lower bridge-arm switch of the first bridge arm, and the plurality of second cell groups are configured to form one of the second upper bridge-arm switch of the second bridge arm and the second lower bridge-arm switch of the second bridge arm; and the plurality of first cell groups and the plurality of second cell groups are switched on and off alternatingly, wherein the plurality of first cell groups are disposed in a first region of the chip, and the plurality of second cell groups are disposed in a second region of the chip; wherein the first region contains a plurality of first sub-regions, and the second region contains a plurality of second sub-regions, and the first sub-regions and the second sub-regions are arranged alternatingly.

According to yet another aspect of the present disclosure, there is provided an integrated power module, which is applied in an alternatingly-switched parallel circuit comprising a first bridge arm and a second bridge arm, wherein the first bridge arm comprises: a first upper bridge-arm switch comprising a first terminal, a second terminal and a control terminal; and a first lower bridge-arm switch comprising a first terminal, a second terminal and a control terminal; a first electrode electrically connected to the first terminal of the first upper bridge-arm switch; a second electrode electrically connected to the second terminal of the first lower bridge-arm switch; and a third electrode electrically connected to the second terminal of the first upper bridge-arm switch and the first terminal of the first lower bridge-arm switch; the second bridge arm comprises: a second upper bridge-arm switch comprising a first terminal, a second terminal and a control terminal, the first electrode being electrically connected to the first terminal of the second upper bridge-arm switch; a second lower bridge-arm switch comprising a first terminal, a second terminal and a control terminal, the second electrode being electrically connected to the second terminal of the second lower bridge arm switch, and a fourth electrode electrically connected to the second terminal of the second upper bridge-arm switch and the first terminal of the second lower bridge-arm switch; the integrated power module further comprises: a first inductor comprising a first terminal and a second terminal, the first terminal of the first inductor being electrically connected to the third electrode, and a second inductor comprising a first terminal and a second terminal, the first terminal of the second inductor being electrically connected to the fourth electrode; wherein one of the first upper bridge-arm switch of the first bridge arm and the first lower bridge-arm switch of the first bridge arm and one of the second upper bridge-arm switch of the second bridge arm and the second lower bridge-arm switch of the second bridge and are formed in a chip, and the chip includes a plurality of first cell groups and a plurality of second cell groups; wherein the plurality of first cell groups and the plurality of second cell groups are switched on and off alternatingly, wherein the plurality of first cell groups are disposed in a first region of the chip, and the plurality of second cell groups are disposed in a second region of the chip; wherein the first region contains a plurality of first sub-regions, and the second region contains a plurality of second sub-regions, and the first sub-regions and the second sub-regions are arranged alternatingly.

According to still another aspect of the present disclosure, there is provided an integrated power package, which is applied in a power circuit comprising a first bridge arm and a second bridge arm, the first bridge arm comprising a first upper bridge-arm switch and a first lower bridge-arm switch, the second bridge arm comprising a second upper bridge-arm switch and a second lower bridge-arm switch, wherein the integrated power package comprises a first switch and a second switch, the first switch and second switch are formed in a chip, and the chip includes a plurality of first cell groups and a plurality of second cell groups; wherein the plurality of first cell groups are configured to form the first switch as one of the first upper bridge-arm switch of the first bridge arm and the first lower bridge-arm switch of the first bridge arm, and the plurality of second cell groups are configured to form the second switch as one of the second upper bridge-arm switch of the second bridge arm and the second lower bridge-arm switch of the second bridge arm; and the plurality of first cell groups and the plurality of second cell groups are switched on and off alternatingly; wherein the plurality of first cell groups are disposed in a first region of the chip, and the plurality of second cell groups are disposed in a second region of the chip; wherein the first region contains a plurality of first sub-regions, and the second region contains a plurality of second sub-regions, and the first sub-regions and the second sub-regions are arranged alternatingly.

Accordingly, the technical solution of the present disclosure may have advantages and beneficial effects compared with the related art. Specifically, through the present disclosure, the upper bridge-arm switches and/or lower bridge-arm switches of the bridge arms may be formed in the same chip. Cells of the groups on the chip are disposed in parallel and switched on alternatingly so that current may be conducted evenly in time domain. Thereby, the conduction loss on the metal interconnection layer inside the chip can be reduced and the overall efficiency of the power supply system can be improved.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Now exemplary embodiments will be fully described with reference to accompanying drawings. However, the exemplary embodiments may be embodied in various forms, and should not be construed as limited to the examples set forth herein. Instead, the embodiments are provided to make the present disclosure more thorough and complete, and to convey the idea of the exemplary embodiments more fully to those skilled in the art. The accompanying drawings are only illustration of the present disclosure, and may be note drawn to scale. Same reference numbers throughout the drawings represent the same or similar parts, and redundant description thereof will be omitted.

In addition, the features, structures and characteristics described are combined in one or more embodiments in any suitable manner. In the description below, specific details are provided for fully understanding of the embodiments of the present disclosure. However, it should be appreciated by those skilled in the art that, one or more specific details may be omitted, or other method, device or steps may be employed in practice of the technical solution of the present disclosure. In other cases, known structure, method, device, implementation, material or operation will not be illustrated or described to avoid obscuring the aspects of the present disclosure.

The following exemplary embodiments do not represent all of the embodiments consistent with the present disclosure. Instead, they are merely examples of devices and methods that are consistent with some aspects of the present disclosure, as set forth in the appended claims.

In the embodiments and claims, the reference "couple" may generally refer to one component connected indirectly to another component through other components, or one component connected directly to another component without other components interposed in between.

In the embodiments and the scope of the application, an article word, "a/an" and "the" may refer to one or more than one, unless specifically specified.

Figure 1:
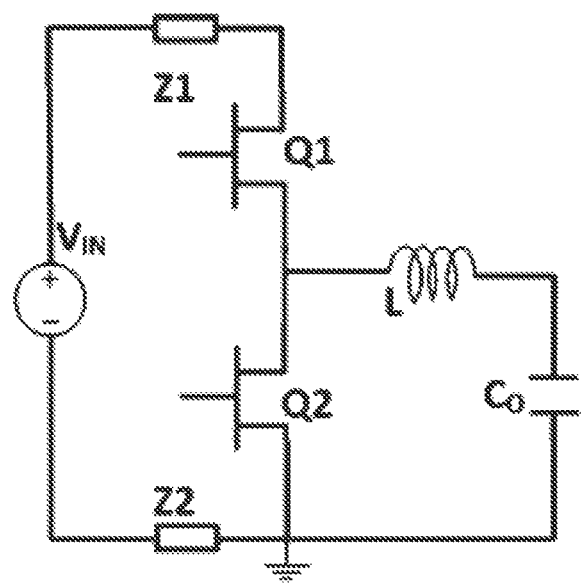
FIG. 1 schematically illustrates an existing power supply topology.
Figure 2:
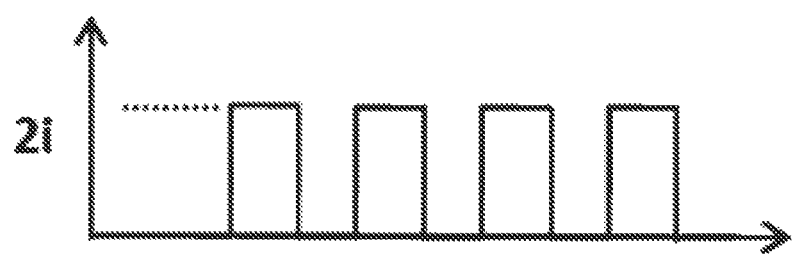
FIG. 2(a) schematically illustrates a time sequence chart of current conduction in the switch circuit as shown in FIG. 1.
FIG. 2(b) illustrates an ideal time sequence chart of evenly conducted current.
Figure 2:
Figure 3:
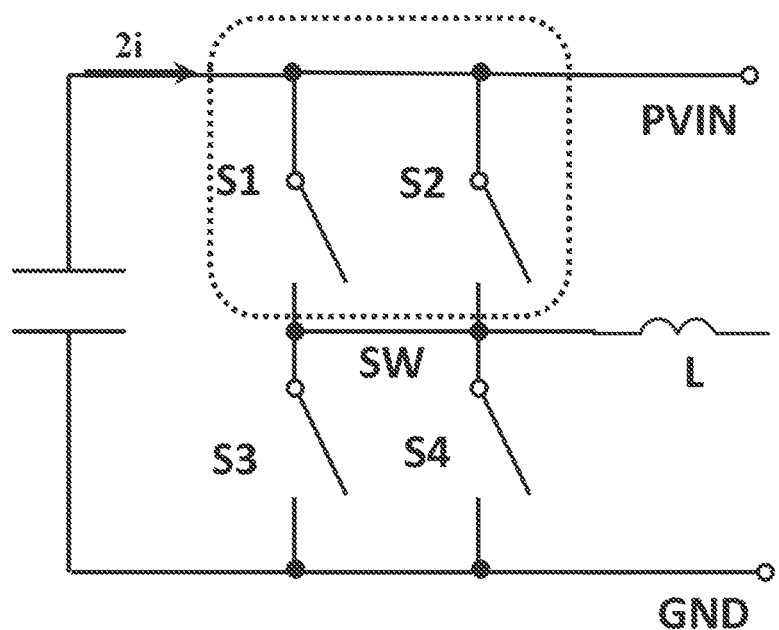
FIG. 3 schematically illustrates a circuit diagram based on theory analysis of the circuit as shown in FIG. 1.

FIG. 3 schematically illustrates a circuit diagram based on theory analysis of FIG. 1.

Figure 7:
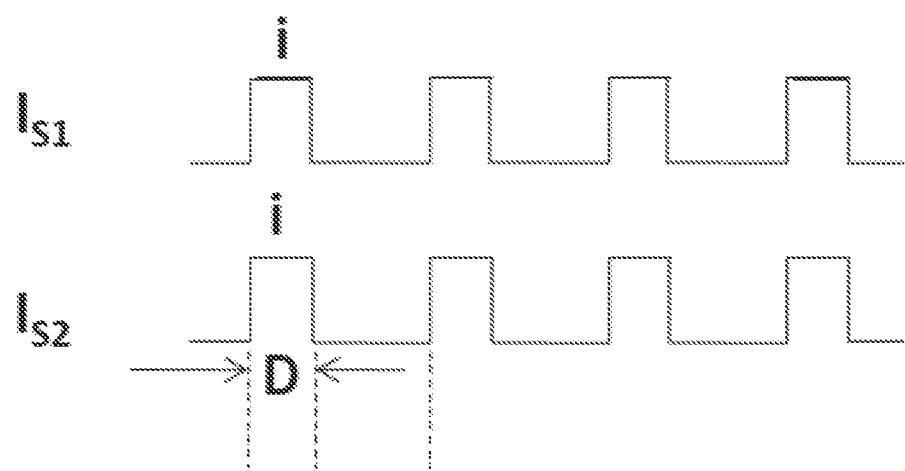
FIG. 7(a) schematically illustrates a time sequence chart of current conduction of the power device as shown in FIG. 3.
FIG. 7(b) schematically illustrates a time sequence chart of current conduction of the alternatingly-switched parallel circuit as shown in FIG. 4.
Figure 7:
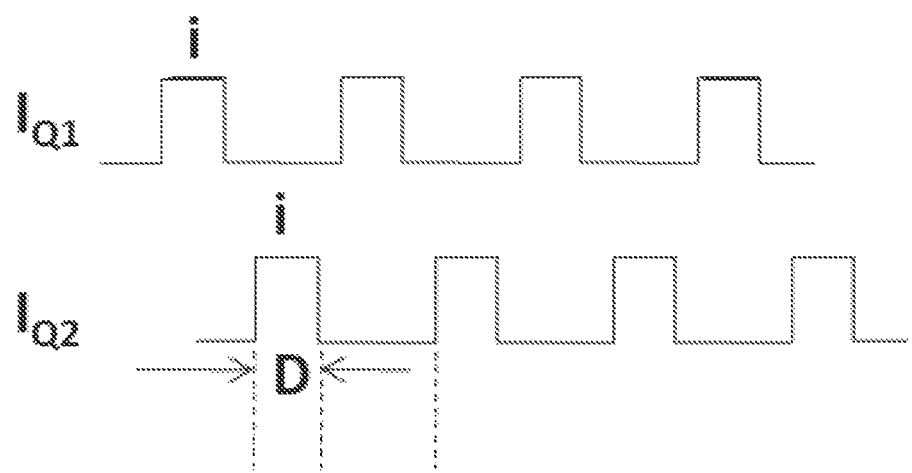
Figure 8:
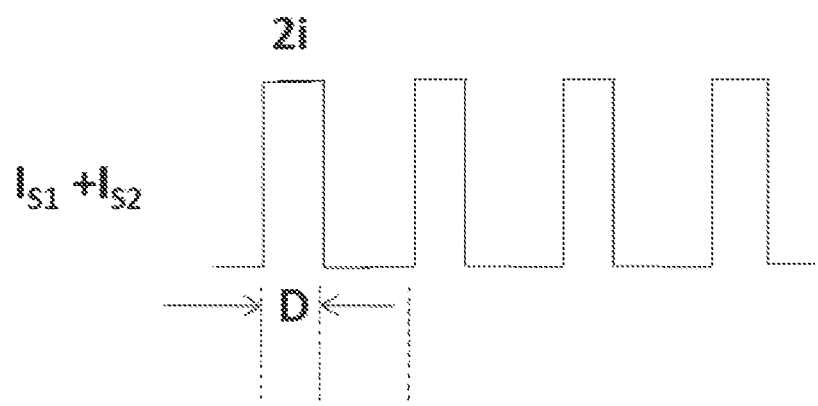
FIG. 8(a) schematically illustrates a time sequence chart of current conduction of the input side of the power device as shown in FIG. 3.
FIG. 8(b) schematically illustrates a time sequence chart of current conduction of the input side of the alternatingly-switched parallel circuit as shown in FIG. 4.
Figure 8:
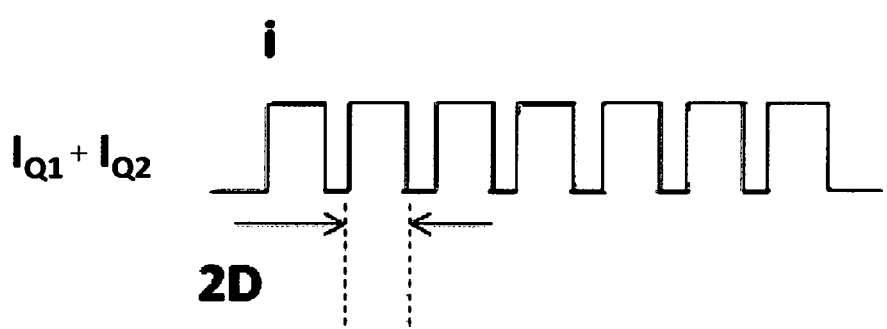

In FIG. 3, the part in the dash-line box represents a power device such as a switch Q1 which may be divided into two cell groups S1 and S2. A first cell group S1 and a second cell group S2 form the switch Q1 of a single bridge arm in FIG. 1. A cell group S3 and a cell group S4 form the switch Q2 of a single bridge arm in FIG. 1. Actually, FIG. 3 shows only one bridge, as the point SW is represented. The two cell groups S1 and S2 are connected in parallel and switched on and off simultaneously. When the circuit is operated in a switch mode, the current of the system is as shown in FIG. 7(a). Since the first cell group S1 and the second cell group S2 in FIG. 3 are switched on and off simultaneously, or operated in the same phase, the input current of the parallel circuit is a switch current with a peak value of 2i, as shown in FIG. 8(a).

If the separated devices are operated in alternatingly-switched mode, the said separated devices contain a first switch or a plurality of first switches (designated Q1) and a second switch or a plurality of second switches (designated Q2), wherein Q1 and Q2 are switched on and off alternatingly. There exists a period of time when Q1 is switched on and Q2 is switched off and there exists another period of time when Q2 is switched on and Q1 is switched off. For example, FIG. 7(b) shows a particular case of alternatingly-switched mode, a first switch Q1 and a second switch Q2 are switched on and off alternatingly, wherein the first switch Q1 conducts current i when the second switch Q2 is switched off and the second switch Q2 conducts current i when the first switch Q1 is switched off. As a result, the parts outside the power device such as connection metal on the system board may be more fully utilized in the time domain, however, it cannot reduce conduction loss of metal inside the chip. Therefore, embodiments of the present disclosure provide a design of an alternatingly-switched parallel circuit inside the chip, in order to reduce conduction loss in the layers inside the chip and improve the efficiency of the entire power supply system.

Figure 4:
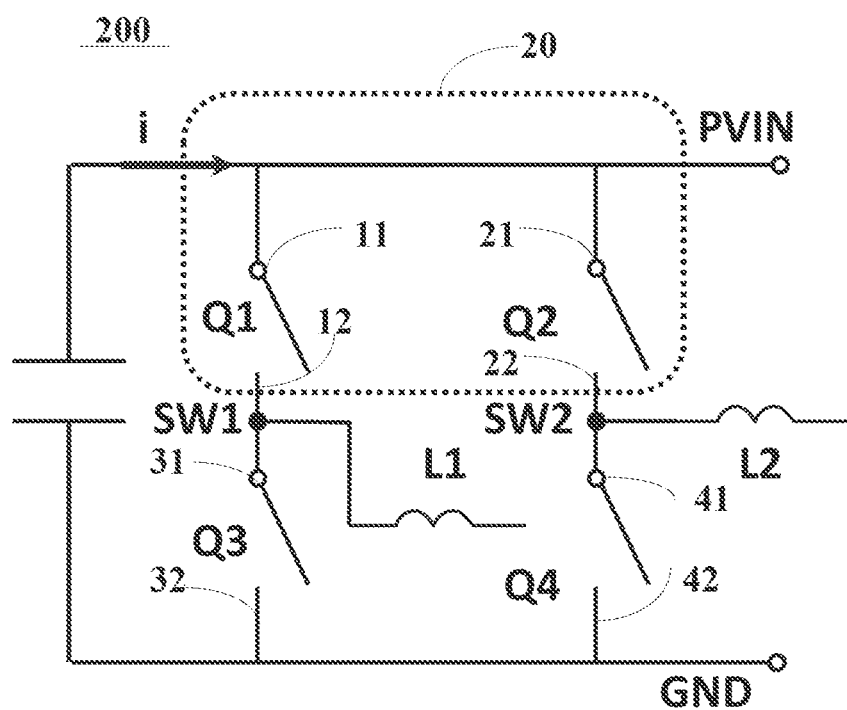
FIG. 4 schematically illustrates a circuit diagram of an alternatingly-switched parallel circuit according to a first exemplary embodiment of the present disclosure.

FIG. 4 schematically illustrates a circuit diagram of an alternatingly-switched parallel circuit according to a first exemplary embodiment of the present disclosure.

As shown in FIG. 4, the alternatingly-switched parallel circuit 200 includes a first bridge arm and a second bridge arm. The first bridge arm includes a first upper bridge-arm switch Q1 and a first lower bridge-arm switch Q3. A second terminal 12 of the first upper bridge-arm switch Q1 is electrically connected to a first terminal 31 of the first lower bridge-arm switch Q3. The second bridge arm includes a second upper bridge-arm switch Q2 and a second lower bridge-arm switch Q4. A second terminal 22 of the second upper bridge-arm switch Q2 is electrically connected to a first terminal 41 of the second lower bridge-arm switch Q3.

In the exemplary embodiment, each of the switches Q1-Q4 may be a Metal-Oxide-Semiconductor Field-Effect Transistor (MOSFET). However, the present disclosure is not limited to the type of the device. Each of the switches may have a source electrode, a drain electrode and a gate electrode connected to a gate driver. The source electrode of the switch of the upper bridge-arm switch may be respectively connected to the drain electrode of the switch of the corresponding lower bridge-arm switch. The source electrode of the upper bridge-arm switch may also be respectively connected to a gate driver connected to the same upper bridge-arm switch. The source electrode of the first lower bridge-arm switch or the second lower bridge-arm switch may also be respectively connected to a gate driver connected to the same lower bridge-arm switch. It may be appreciated by those skilled in the art that the terms "upper" and "lower" used for describing the upper bridge-arm switches and the lower bridge-arm switches do not refer to actual and physical arrangement.

It should be noted that, although in the exemplary illustration in FIG. 4 and the exemplary description below, the circuit includes a first bridge arm and a second bridge arm connected in parallel, however, in practice, the alternatingly-switched parallel circuit may have a number n (n≥2) of parallel bridge arms, such as a third bridge arm, a fourth bridge arm, . . . and a $n^{th}$ bridge arm. Each of the n bridge arms includes at least two bridge-arm switches, i.e. an upper bridge-arm switch and a lower bridge-arm switch.

In the first exemplary embodiment as shown in FIG. 4, the first bridge arm and the second bridge arm may be at least partly formed in a chip. For example, the first upper bridge-arm switch Q1 of the first bridge arm and the second upper bridge-arm switch Q2 of the second bridge arm are formed in a chip 20. If the circuit includes n parallel bridge arms, all of the upper bridge-arm switches of the n parallel bridge arms may be formed m the same chip 20. Alternatively, any two, three or (n−1) of the upper bridge-arm switches of the n parallel bridge arms may be formed in the chip 20. This is not limited in the present disclosure.

In the exemplary embodiment, the chip 20 includes a plurality of first cell groups S1 and a plurality of second cell groups S2. Each of the first cell groups S1 and the second cell groups S2 may include one or more cells. The plurality of first cell groups S1 form the first upper bridge-arm switch Q1 of the first bridge arm, and the plurality of second cell groups S2 form the second upper bridge-arm switch Q2 of the second bridge arm. The plurality of first cell groups S1 and the plurality of second cell groups S2 may be independently operated in alternatingly-switched mode with a phase difference of 180 degrees, for example. The outlet terminals of the switches are respectively connected to a load inductor L1 and a load inductor L2. When the system is operated in an alternatingly-switched mode, the current in the operation mode is as shown in FIG. 7(b). When S1 and S2 are switched on, a discontinuous current with a duty cycle D and a peak value i flows through S1 and a discontinuous current with a duty cycle D and a peak value i flows through S2, respectively as shown in FIG. 4. Since S1 and S2 in FIG. 4 are operated in alternatingly-switched mode (for example with a phase difference of 180°), the current through S1 and S2 flows through the input side and the input-side current has a decreased peak value i, as shown in FIG. 8(b). In an embodiment, the chip may have only a plurality of first cell groups and a plurality of second cell groups.

With a certain size of the chip device itself, the cells inside the chip may be grouped to form different upper bridge-arm switches, and the switches may be controlled in alternatingly-switched mode. In this way, when a power of the same level is transferred, the loss may be reduced.

The power device semiconductor as shown in FIG. 3 has a conduction loss:

$$(2i)^2 \times (Rdson/2) \times D = 2i^2 Rdson \times D \quad (1)$$

Where, Rdson is a conduction impedance of a switch, and D is a duty cycle of a current through the switch.

When D<50% and phase difference between Q1 and Q2 is 180°, the power device semiconductor operated in alternatingly switched mode provided by the embodiments of the present disclosure as shown in FIG. 4 has a conduction loss:

$$((i)^2 \times (Rdson) + (i)^2 \times (Rdson)) \times D = 2i^2 Rdson \times D \quad (2)$$

As can be seen from the above formulas (1) and (2), the power device operated in the same phase and the power device operated in alternatingly-switched mode has the same conduction loss on the semiconductors, but the input-side current of the power device operated in alternatingly-switched mode may be more approximate to a desirable continuous conducted state. Although it is assumed in the embodiments of the present disclosure that D is less than 50% and phase difference between Q1 and Q2 is 180° for the simplicity of calculation and ease of comparison, the same conclusions hold even if D is equal to or greater than 50% or phase difference is other than 180°.

Figure 5:
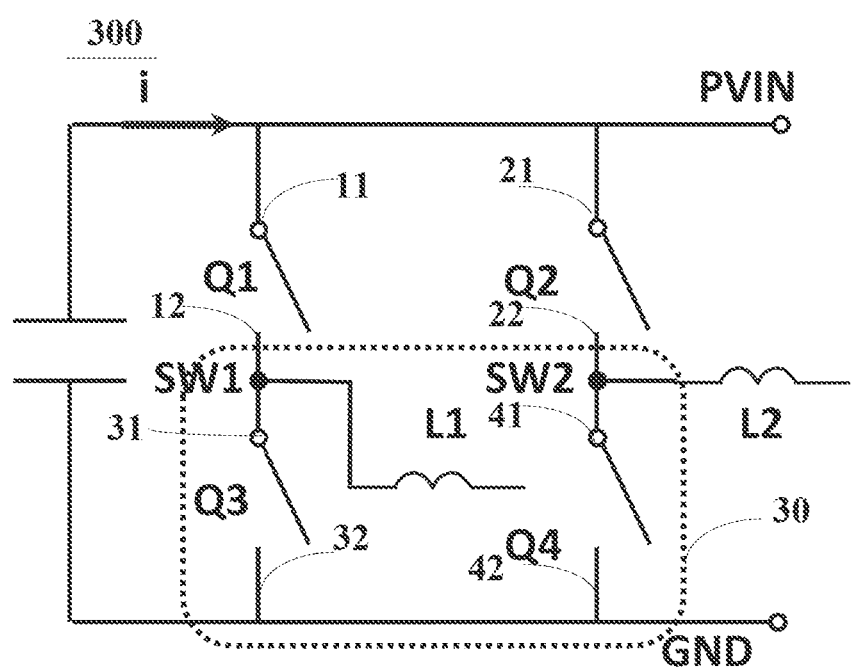
FIG. 5 schematically illustrates a circuit diagram of an alternatingly-switched parallel circuit according to a second exemplary embodiment of the present disclosure.

In an alternatingly-switched parallel circuit 300 as shown in FIG. 5, the first bridge arm and the second bridge arm may be at least partly formed in a chip. For example, the first lower bridge-arm switch Q3 of the first bridge arm and the second lower bridge-arm switch Q4 of the second bridge arm are formed in a chip 30. Similarly, if the alternatingly-switched parallel circuit includes n parallel bridge arms, all of the lower bridge-arm switches of the n parallel bridge arms may be formed in the chip 30. Alternatively, any two, three or (n−1) of the lower bridge-arm switches of the n parallel bridge arms may be formed in the chip 30. This is not limited in the present disclosure. The chip which forms the first lower bridge-arm switch Q3 and the second lower bridge-arm switch Q4 may be a different chip from the chip which forms the first upper bridge-arm switch Q1 and the second upper bridge-arm switch Q2, but the disclosure is not limited thereto.

In the exemplary embodiment, the chip 30 includes a plurality of first cell groups S1 and a plurality of second cell groups S2. Each of the first cell groups S1 and the second cell groups S2 may include one or more cells. The plurality of first cell groups S1 form the first lower bridge-arm switch Q3 of the first bridge arm, and the plurality of second cell groups S2 form the second lower bridge-arm switch Q4 of the second bridge arm.

Figure 6:
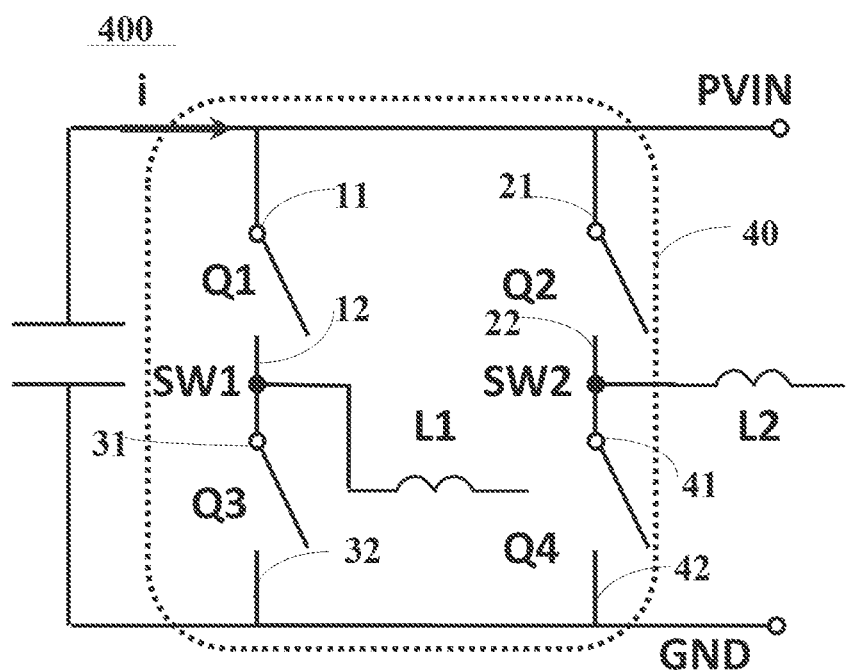
FIG. 6 schematically illustrates a circuit diagram of an alternatingly-switched parallel circuit according to a third exemplary embodiment of the present disclosure.

In an alternatingly-switched parallel circuit 400 as shown in FIG. 6, the first bridge arm and the second bridge arm may at least partly formed in a chip. For example, the first upper bridge-arm switch Q1 and the first lower bridge-arm switch Q3 of the first bridge arm, and the second upper bridge-arm switch Q2 and the second lower bridge-arm switch Q4 of the second bridge arm are formed in a chip 40. Similarly, if the alternatingly-switched parallel circuit includes n parallel bridge arms, all of the upper and lower bridge-arm switches of the n parallel bridge arms may be formed in the chip 40. Alternatively, any two, three or (n−1) pairs of the upper and lower bridge-arm switches of the n parallel bridge arms may be formed in the chip 40. This is not limited in the present disclosure.

In the exemplary embodiment, the chip 40 includes a plurality of first cell groups S1, a plurality of second cell groups S2, a plurality of third cell groups S3 and a plurality of fourth cell groups S4. Each of the first cell groups S1, the plurality of second cell groups S2, the plurality of third cell groups S3 and the plurality of fourth cell groups S4 may include one or more cells. In one embodiment, the plurality of first cell groups S1 form the first upper bridge-arm switch Q1 of the first bridge arm, the plurality of second cell groups S2 form the second upper bridge-arm switch Q2 of the second bridge arm, the plurality of third cell groups S3 form the first lower bridge-arm switch Q3 of the first bridge arm, and the plurality of fourth cell groups S4 form the second lower bridge-arm switch Q4 of the second bridge arm.

In an exemplary embodiment, the above alternatingly-switched parallel circuit 200, 300 or 400 also includes a first inductor L1 and a second inductor L2. A first terminal of the first inductor L1 is electrically connected to the second terminal of the first upper bridge-arm switch Q1 and the first terminal of the first lower bridge-arm switch Q3. A first terminal of the second inductor L2 is electrically connected to the second terminal of the second upper bridge-arm switch Q2 and the first terminal of the second lower bridge-arm switch Q4. A second terminal of the first inductor L1 is electrically connected to a second terminal of the second inductor L2.

In another embodiment, still referring to FIGS. 4-6, there is also disclosed an integrated power module, which is applied in any of the above alternatingly-switched parallel circuits as shown in FIGS. 4-6. The integrated power module includes at least part of a first bridge arm and a second bridge arm. The first bridge arm includes a first upper bridge-arm switch Q1 and a first lower bridge-arm switch Q3. The first bridge arm also includes a first electrode PVIN electrically connected to a first terminal 11 of the first upper bridge-arm switch Q1, a second electrode GND electrically connected to a second terminal 32 of the first lower bridge-arm switch Q3, and a third electrode SW1 electrically connected to a second terminal 12 of the first upper bridge-arm switch Q1 and a first terminal 31 of the first lower bridge-arm switch Q3. The second bridge includes a second upper bridge-arm switch Q2 and a second lower bridge-arm switch Q4. The first electrode PVIN is electrically connected to a first terminal 21 of the second upper bridge-arm switch Q2. The second electrode GND is electrically connected to a second terminal 42 of the second lower bridge-arm switch Q4. The second bridge arm also includes a fourth electrode SW2 electrically connected to a second terminal 22 of the second upper bridge-arm switch Q2 and a first terminal 41 of the second lower bridge-arm switch Q4. The integrated power module also includes a first inductor L1 and a second inductor L2. A first terminal of the first inductor L1 is electrically connected to the third electrode SW1. A first terminal of the second inductor L2 is electrically connected to the fourth electrode SW2. A second terminal of the first inductor L1 is electrically connected to a second terminal of the second inductor L2. In FIG. 4, the first upper bridge-arm switch Q1 of the first bridge arm and the second upper bridge-arm switch Q2 of the second bridge arm are formed in a chip 20. In FIG. 5, the first lower bridge-arm switch Q3 of the first bridge arm and the second lower bridge-arm switch Q4 of the second bridge arm are formed in a chip 30. In FIG. 6, the first upper bridge-arm switch Q1 and the first lower bridge-arm switch Q3 of the first bridge arm, and the second upper bridge-arm switch Q2 and the second lower bridge-arm switch Q4 of the second bridge arm are formed in a chip 40. The structure of the chips 20, 30 and 40 are described as above, which will not be repeated herein. Also as shown in FIG. 4, FIG. 5 and FIG. 6, the power circuit further comprises an input capacitor or a plurality of capacitors connected in parallel with the first bridge arm and the second bridge arm. Theoretically, the capacitor or the plurality of capacitors should be positioned as close as possible to the said first bridge arm and/or the second bridge arm in order to reduce the effective parasitic inductance of the input loop, thus improving high-frequency switching performance of the circuit. For example, the said capacitor or plurality of capacitors are integrated in the power module and disposed on top of the chip 20, 30 or 40 to reduce the distance between the capacitors and the bridge-arm switches. That is, the capacitor overlaps with the chip 20, 30 or 40 from a vertical view of the chip. As another example, the capacitor or plurality of capacitors are formed in the chip, rendering them even closer to the bridge-arm switches.

In another embodiment, still referring to FIGS. 4 and 5, there is also disclosed an integrated power package which is applied in a power circuit. The power circuit includes a first bridge arm and a second bridge arm, the structure and configuration of which may be the same as those of the first bridge arm and the second bridge arm in the above embodiments. The integrated power package includes a first switch and a second switch. The first switch and the second switch are formed in a chip. A plurality of first cell groups S1 and a plurality of second cell groups S2 are disposed on the chip. As shown in FIG. 4, the plurality of first cell groups S1 are configured to form the first switch which is used as the first upper bridge-arm switch Q1 of the first bridge arm. The plurality of second cell groups S2 are configured to form the second switch which is used as the second upper bridge-arm switch Q2 of the second bridge arm. As shown in FIG. 5, the plurality of first cell groups S1 are configured to form the first switch which is used as the first lower bridge-arm switch Q3 of the first bridge arm. The plurality of second cell groups S2 are configured to form the second switch which is used as the second lower bridge-arm switch Q4 of the second bridge arm. The plurality of first cell groups S1 and the plurality of second cell groups S2 are switched on and off alternatingly. Also, as shown in FIG. 4 and FIG. 5, the power circuit may further comprise an input capacitor or a plurality of capacitors connected in parallel with the first bridge arm and the second bridge arm. Similar to the previous embodiment, the capacitor or the plurality of capacitors should be placed close to the bridge arm switches Q1~Q4. For example, the capacitors are formed in the chip or the integrated power package in order to reduce the effective parasitic inductance of the input loop, thus improving high-frequency switching performance of the circuit.

In another embodiment, still referring to FIG. 6, there is also disclosed an integrated power package which is applied in a power circuit. The power circuit includes a first bridge arm and a second bridge arm, the structure and configuration of which may be the same as those of the first bridge arm and the second bridge arm in the above embodiments. The integrated power package includes a first switch, a second switch, a third switch and a fourth switch. The first switch, the second switch, the third switch and the fourth switch are formed in a chip. A plurality of first cell groups S1, a plurality of second cell groups S2, a plurality of third cell groups S3, and a plurality of fourth cell groups S4 are disposed on the chip. As shown in FIG. 6, the plurality of first cell groups S1 are configured to form the first switch which is used as the first upper bridge-arm switch Q1 of the first bridge arm. The plurality of second cell groups S2 are configured to form the second switch which is used as the second upper bridge-arm switch Q2 of the second bridge arm. The plurality of third cell groups S3 are configured to form the third switch which is used as the first lower bridge-arm switch Q3 of the first bridge arm. The plurality of fourth cell groups S4 are configured to form the fourth switch which is used as the second lower bridge-arm switch Q4 of the second bridge arm. The plurality of first cell groups S1 and the plurality of second cell groups S2 are switched on and off alternatingly. The plurality of third cell groups S3 and the plurality of fourth cell groups S4 are switched on and off alternatingly. Also, as shown in FIG. 6, the power circuit further comprises an input capacitor or a plurality of capacitors connected in parallel with the first bridge arm and the second bridge arm. Similar to the previous embodiments, the capacitor or the plurality of capacitors should be placed close to the bridge arm switches Q1~Q4. For example, the capacitors are formed in the chip or in the integrated power package in order to reduce the effective parasitic inductance of the input loop, thus improving high-frequency switching performance of the circuit.

Hereinafter the alternatingly-switched parallel circuit will be described in detail, taking the circuit as shown in FIG. 4 as an example.

In design of a chip, each power chip may be divided into numerous minimum functional units. The minimum functional units (referred to as cells in the present disclosure) may be connected to one another in parallel through conductive paths, to collectively form a semiconductor power device with current conduction capability. By controlling the area of the chip, and thus controlling the number of the cells integrated in the chip, the power capacity (i.e. the current conduction capability) of the chip may be determined.

In the alternatingly-switched parallel circuit provided by the embodiments of the present disclosure, which is operated in alternatingly-switched mode within the chip, it may be not required that all of the cells in the power chip are connected in parallel. Instead, the cells in the power chip are divided into a number m (m≥2) of groups. Cells in each group are connected in parallel, and controlled by the same control terminal to be switched on and off simultaneously. Cells in different groups are controlled by different control terminals, and are operated in different phases (the range of the phases may be for example 0~180°). Here, the cells are divided into groups of the number m which corresponds to the number of the switches integrated in the chip. For example, when an alternatingly-switched parallel circuit includes a number n of parallel bridge arms, and the upper bridge-arm switches or the lower bridge-arm switches of the n parallel bridge arms are integrated in the same chip, m is equal to n and the m groups of cells are configured to respectively form the n upper bridge-arm switches or the n lower bridge-arm switches. Alternatively, when all of the upper bridge-arm switches and the lower bridge-arm switches of the n parallel bridge anus are integrated in the same chip, the cells in the power chip may be divided into a number 2n of groups, meaning m=2n. The 2n groups of cells are configured to respectively form the n upper bridge-arm switches and the n lower bridge-arm switches. Alternatively, from any number k of the n parallel bridge arms in the alternatingly-switched parallel circuit, the upper bridge-arm switches and/or lower bridge-arm switches of the k parallel bridge arms may be integrated in the same chip. Here, m and n each is a positive integer.

In an exemplary embodiment, the plurality of first cell groups S1 and the plurality of second cell groups S2 are switched on and off alternatingly. In a particular case, the plurality of first cell groups S1 and the plurality of second cell groups S2 are switched on and off in an alternatingly-switched mode, wherein the plurality of first cell groups S1 and the plurality of second cell groups S2 are switched on and off alternatingly and cyclically with the same period and a certain phase difference. In one embodiment, the plurality of first cell groups S1 and the plurality of second cell groups S2 may be switched on and off in an alternatingly-switched mode with a phase difference of 180 degrees. In another embodiment, the plurality of first cell groups S1 and the plurality of second cell groups S2 may be switched on and off in an alternatingly-switched mode with a phase difference of 120 degrees. In another embodiment, the plurality of first cell groups S1 and the plurality of second cell groups S2 may be switched on and off in an alternatingly-switched mode with a phase difference of 90 degrees. As an example, the alternatingly-switched mode with a phase difference of 180 degrees will be described in detail below.

Figure 9:
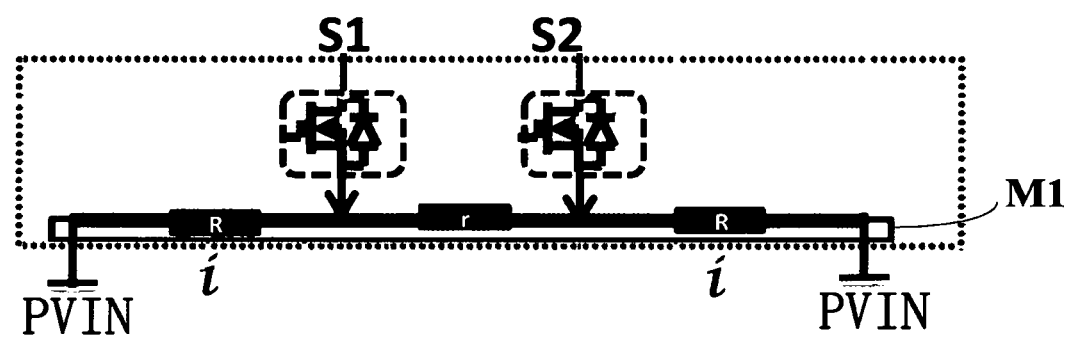
FIG. 9(a) schematically illustrates two cell groups switched on simultaneously inside a power chip operated in the same phase.
FIG. 9(b) schematically illustrates two cell groups switched off simultaneously inside a power chip operated in the same phase.
Figure 9:
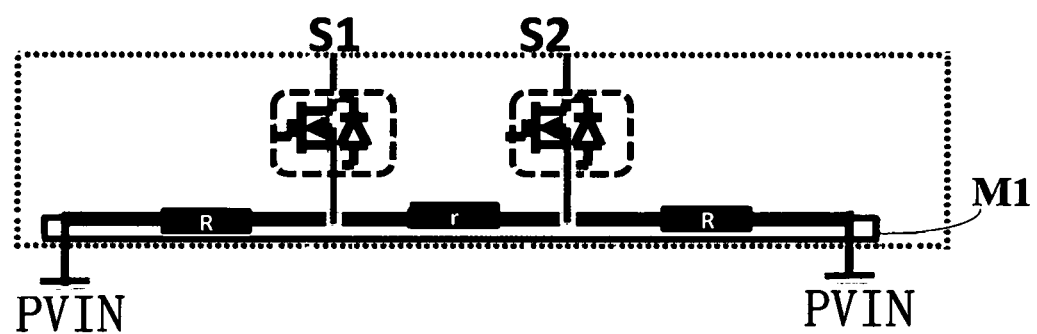

Based on FIG. 4, the current conduction in metal layers of the power chip will be analyzed. Adjacent cell groups between two PVIN PADs (metal pads) will be described as an example. As shown in FIGS. 9(*a*), 9(*b*), 10(*a*) and 10(*b*), each being a cross-sectional schematic representation of a power chip, a first cell group S1 and a second cell group S2 are disposed adjacent to each other, respectively represented by a dash-line box. A first metal layer M1 is interconnection metal inside the chip, and configured to interconnect different cell groups. The impedance of the metal interconnection between the first cell group S1 and the second cell group S2 is r. The impedance of the path leading outside to the first electrode PVIN at the input side is R. Since the distance between the two groups of cells are generally far less than the distance between one group of cells and the PVIN PAD, it can be presumed that r«R and r may be negligible.

As shown in FIGS. 9(*a*) and 9(*b*), when the power chip is not operated in alternatingly-switched mode, the first cell group S1 and the second cell group S2 are switched on simultaneously (as shown in FIG. 9(*a*)), or switched off simultaneously (as shown in FIG. 9(*b*)). In this case, the conduction loss of the first metal layer M1 in one cycle may be calculated through the following formula:

$$(2i)^2 \times (R/2) \times D = 2i^2 R \times D \tag{3}$$

Figure 10:
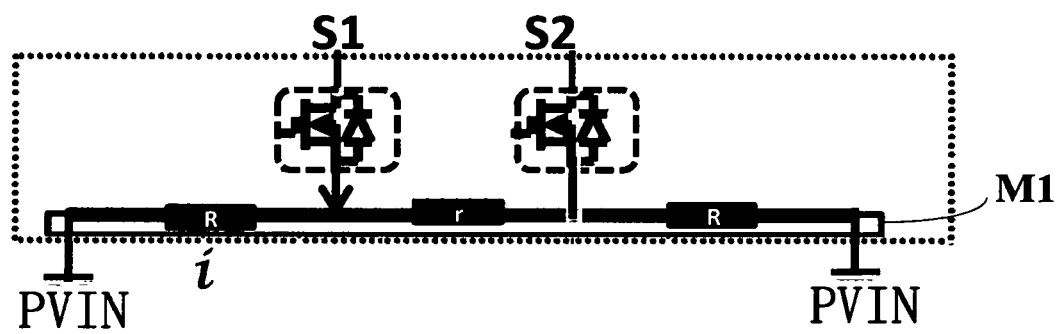
FIGS. 10(a) and 10(b) respectively schematically illustrate two cell groups switched on and off alternatingly inside a power chip operated in alternatingly-switched mode.
Figure 10:
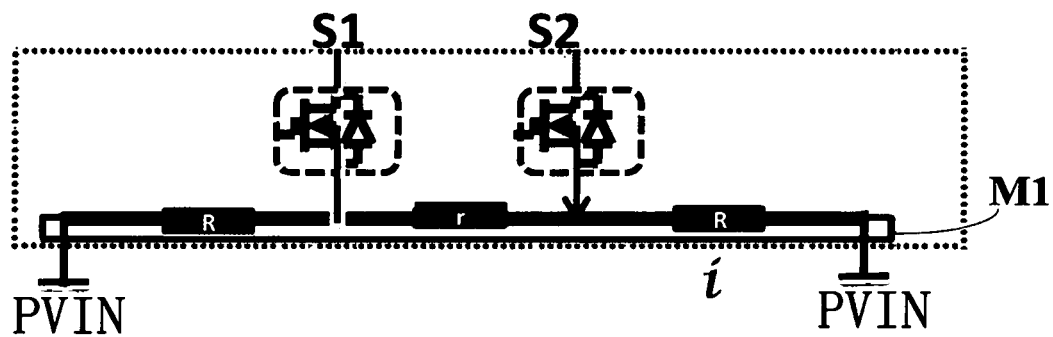
Figure 11:
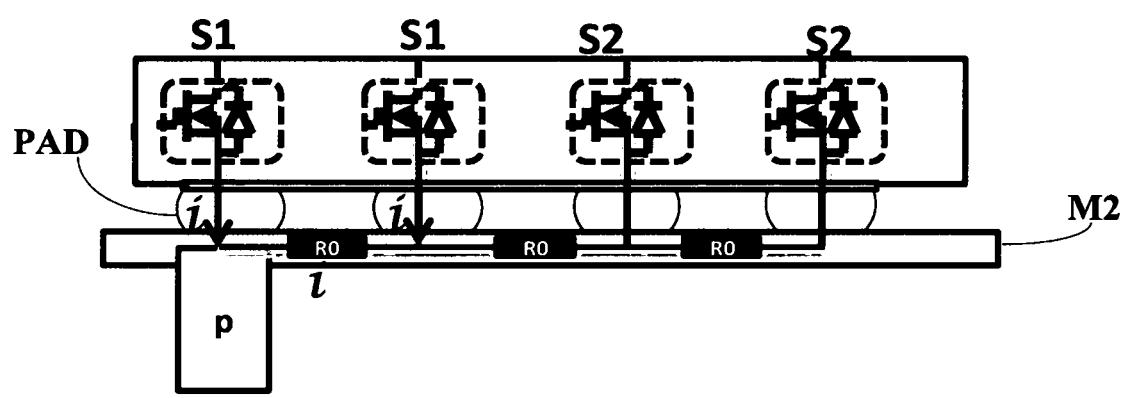
FIGS. 11(a) and 11(b) respectively schematically illustrate cell groups switched on and off alternatingly, with an external pin disposed near an edge position of a power chip operated in alternatingly-switched mode.
Figure 11:
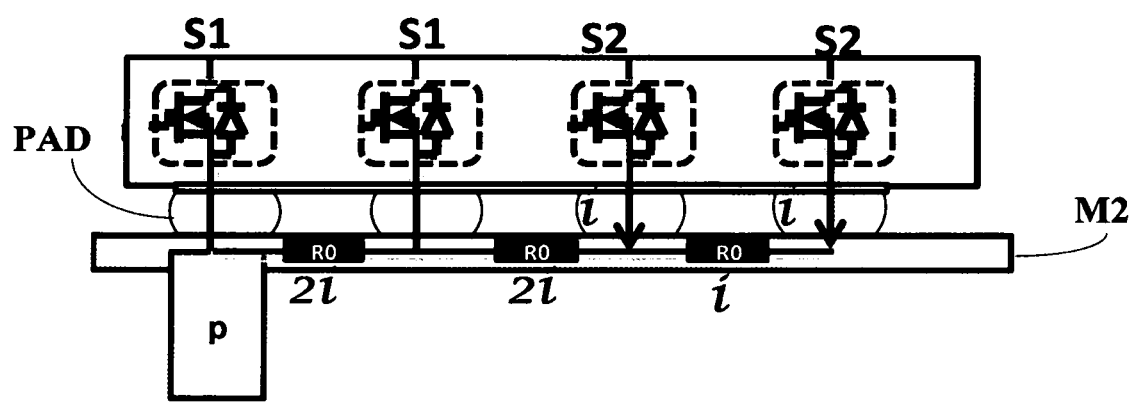
Figure 12:
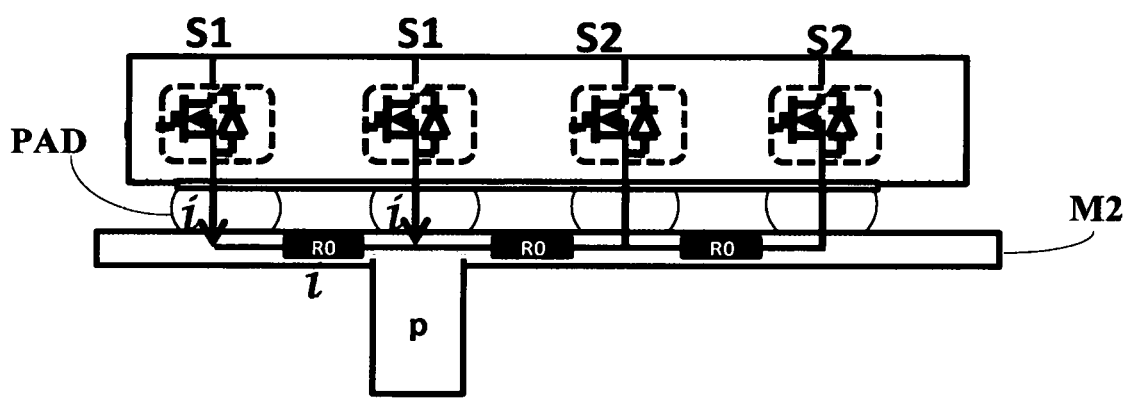
FIGS. 12(a) and 12(b) respectively schematically illustrate cell groups switched on and off alternatingly, with an external pin disposed near a central position of a power chip operated in alternatingly-switched mode.
Figure 12:
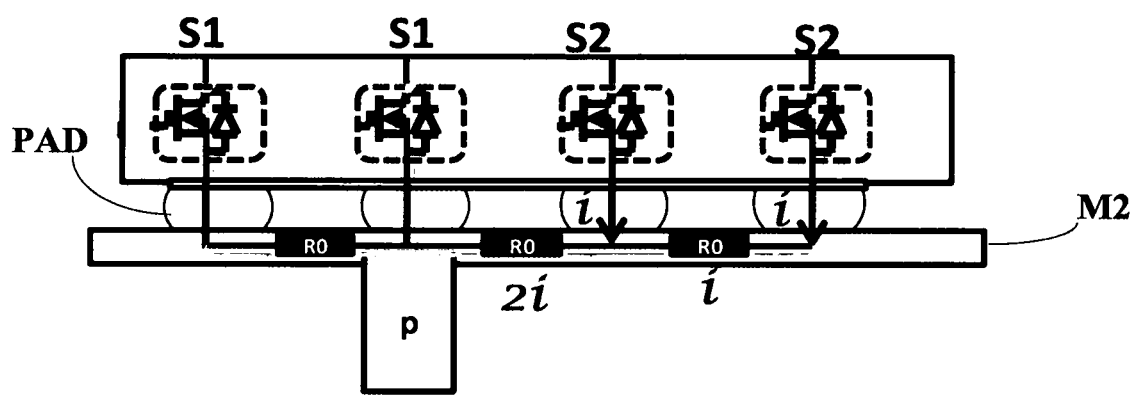
Figure 13:
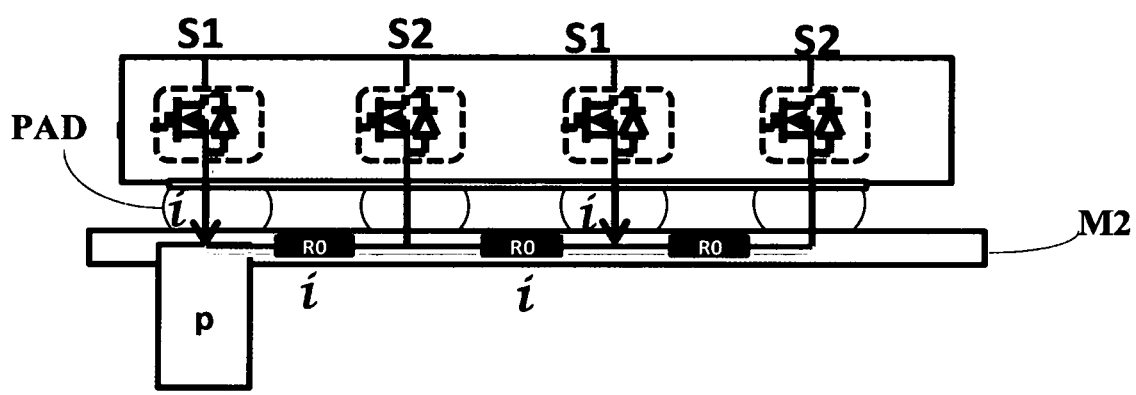
FIGS. 13(a) and 13(b) respectively schematically illustrate cell groups switched on and off alternatingly, with the cell groups arranged alternatingly and an external pin disposed near an edge position of a power chip operated in alternatingly-switched mode.
Figure 13:
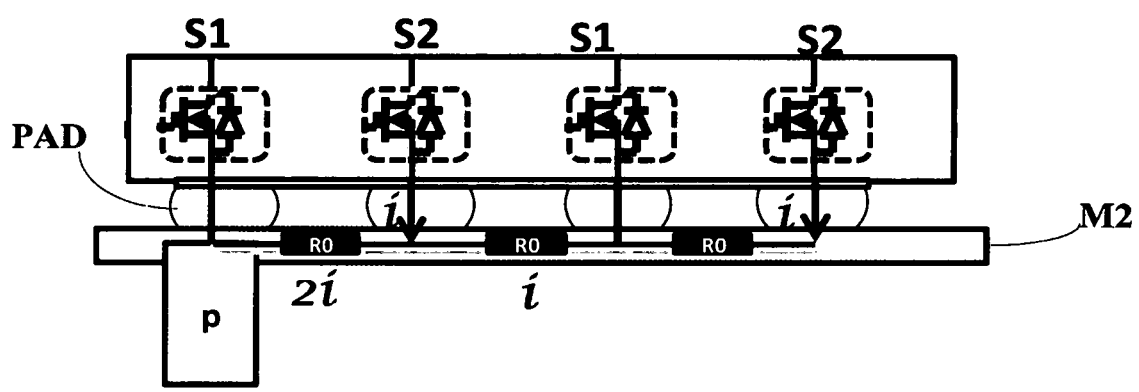
Figure 14:
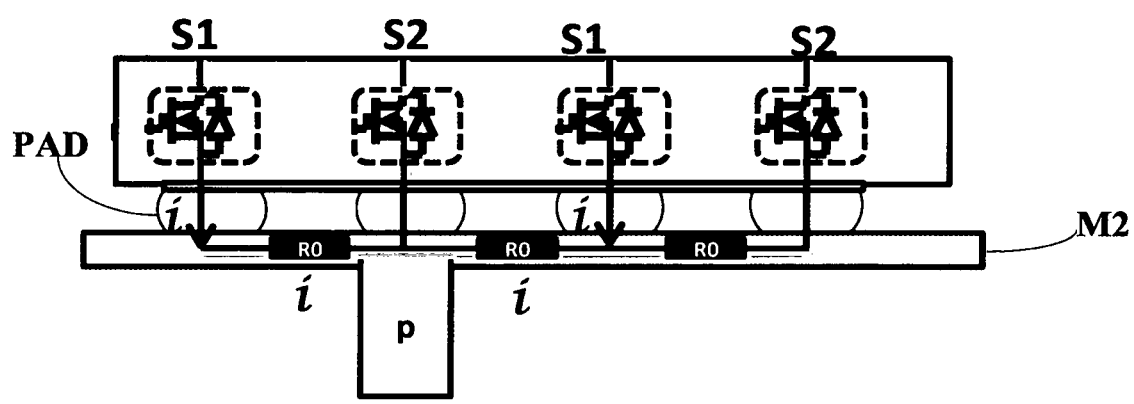
FIGS. 14(a) and 14(b) respectively schematically illustrate cell groups switched on and off alternatingly, with the cell groups arranged alternatingly and an external pin disposed near a central position of a power chip operated in alternatingly-switched mode.
Figure 14:
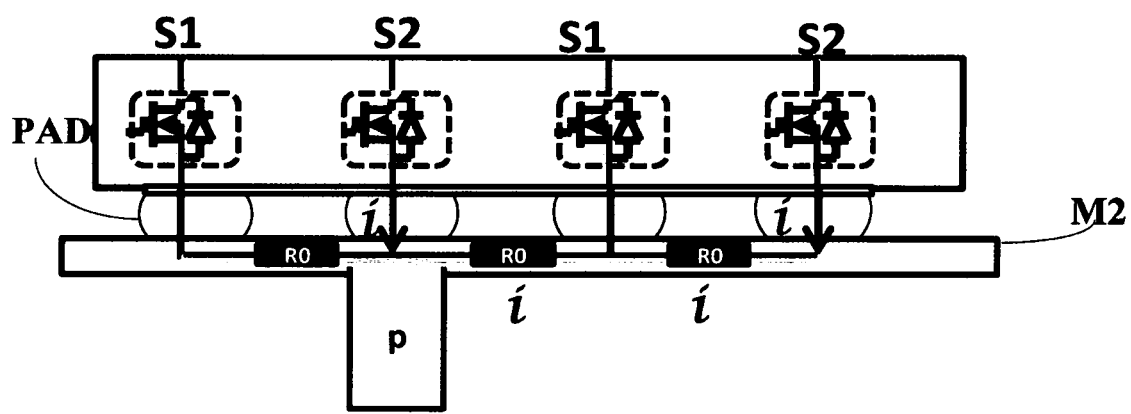

As shown in FIGS. 10(*a*) and 10(*b*), when the power chip is operated in alternatingly-switched mode, the first cell group S1 and the second cell group S2 are independently controlled to be switched on and off in an alternatingly-switched mode. When D<50% and phase difference between S1 and S2 is 180°, the conduction loss of the first metal layer M1 in one cycle may be calculated through the following formula:

$$i^2 \times (R/2) \times D + i^2 \times (R/2) \times D = i^2 R \times D \tag{4}$$

Compared with the above formulas (3) and (4), it can be seen that by implementing an alternatingly-switched parallel circuit inside the power chip, it can more folly improve the utilization of the metal interconnection layer in the chip, and reduce the overall conduction loss, and in turn, reduce the overall loss of the chip. Although it is assumed in this embodiment that D is less than 50% and phase difference between S1 and S2 is 180° for the simplicity of calculation and ease of comparison, the same conclusions hold even if D is equal to or greater than 50% or phase difference is other than 180°.

In addition to the metal interconnection layer inside the chip (i.e. the above first metal layer M1), surface metal for packaging the chip will also cause conduction loss. Such conduction loss will be influenced, by the position of the packaged pin (the position where the pin leads out), distribution of the cell groups operated in alternatingly-switched mode, and other factors. Therefore, more cells need to be analyzed. As discussed above, the cells inside the power chip which are operated in alternatingly-switched mode are divided into S1 and S2, and in each group, more cells are connected in parallel.

As shown in FIGS. 11-16, it may be assumed that a plurality of first cell groups S1 and a plurality of second cell groups S2 are disposed inside one power chip. It should be noted that, although in the figure only two first cell groups S1 and two second cell groups S2 are shown for illustration, in practice, the number of the first cell groups S1 and the second cell groups S2 are not limited. Moreover, the cells may not only be divided into two cell groups, but there may be a third cell group, a fourth cell group, . . . , a $m^{th}$ cell group, where m is a positive integer. The m cell groups are switched on and off in alternatingly-switched mode, and adjacent two cell groups have phase difference of $2\pi/m$, the cell groups of the same ordinal number are switched simultaneously. For example, the plurality of first cell groups S1 are switched on and off simultaneously, the plurality of second cell groups S2 are switched on and off simultaneously, and the first cell groups S1 and the second cell groups S2 are operated in alternatingly-switched mode.

In an exemplary embodiment, the plurality of first cell groups S1 have a first external pin or a plurality of first external pins. The plurality of second cell groups S2 have a second external pin or a plurality of second external pins. The said first external pin or one of the plurality of first external pins and the said second external pin or one of the plurality of second external pins may be electrically connected. In particular, S1 and S2 may share the same external pin, shown as pin P in FIGS. 11-16. The cells are connected to a second metal layer M2 through surface PADs, that is, the package of the surface pads are connected to the metal layer. It may be assumed that the impedance of the interconnect metal of the package metal between the PADs is R0.

As shown in FIGS. 11(a) and 11(b), the external pin of the power device operated in alternatingly-switched mode is near an edge (for example, the leftmost side) of the power chip and the two cell groups S1 and S2 are respectively distributed in two regions of the power chip. For example, two first cell groups S1 are disposed on the left side of the power chip, and two second cell groups S2 are disposed on the right side of the power chip. In FIG. 11(a), the two first cell groups S1 are simultaneously switched on, and the two second cell groups S2 are simultaneously switched off. In FIG. 11(b), the two first cell groups S1 are simultaneously switched off, and the two second cell groups S2 are simultaneously switched on. In FIGS. 11(a) and 11(b), the external pin p is disposed at the first one of the two first cell groups S1.

As shown in FIGS. 12(a) and 12(b), the external pin of the power device operated in alternatingly-switched mode is near the central position of the power chip and the two cell groups S1 and S2 are respectively distributed in two regions of the power chip. The FIGS. 12(a) and 12(b) differ from the FIGS. 11(a) and 11(b) in that, the external pin p is disposed at the second one of the two first cell groups S1.

As shown in FIGS. 13(a) and 13(b), the external pin of the power device operated in alternatingly-switched mode is near an edge of the power chip. Cell groups S1 are disposed in a plurality of first sub-regions of the power chip, cell groups S2 are disposed in a plurality of second sub-regions of the power chip, the first sub-regions and the second sub-regions are arranged alternatingly. That is to say, one of the said first cell groups disposed in the first sub-regions is positioned between two of the said second cell groups disposed in the second sub-regions and one of the said second cell groups disposed in the second sub-regions is positioned between two of the said first cell groups disposed in the first sub-regions along a particular direction or from a certain cross-sectional view. For example, a first one of the second cell groups S2 is disposed between a first one of the first cell groups S1 and a second one of the first cell groups S1, and a second one of the first cell groups S1 is disposed between the first one of the second cell groups S2 and the second one of the second cell groups S2. The plurality of first cell groups S1 and the plurality of second cell groups S2 may be arranged similarly. The external pin p is disposed at the first one of the first cell groups S1.

As shown in FIGS. 14(a) and 14(b), the external pin of the power device operated in alternatingly-switched mode is near the central position of the power chip and the two cell groups S1 and S2 are arranged alternatingly. The FIGS. 14(a) and 14(b) differ from the FIGS. 13(a) and 13(b) in that the external pin p is disposed at the first one of the second cell groups S2.

Figure 15:
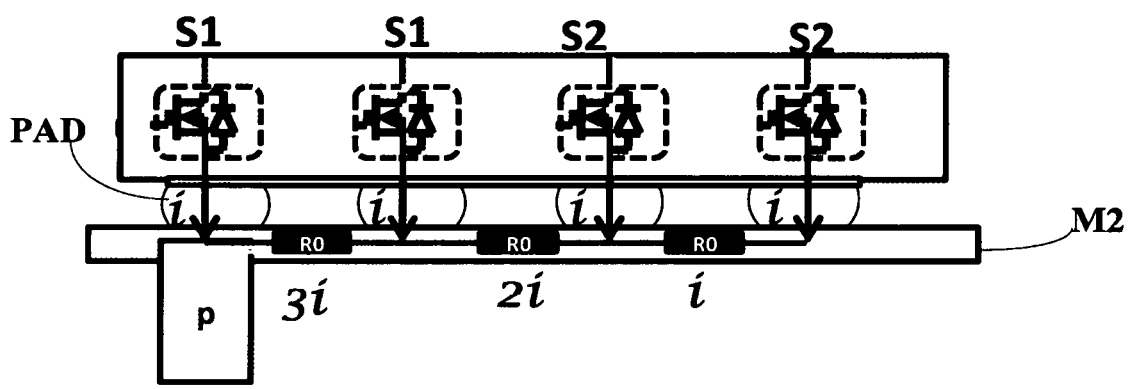
FIG. 15 schematically illustrates an external pin disposed near an edge position of a power chip inside a power chip operated in the same phase.

As shown in FIG. 15, the external pin of the power device operated in the same phase is near an edge of the power chip. The plurality of first cell groups S1 and the plurality of second cell groups S2 are simultaneously switched on and off. The external pin p is disposed at the first one of the first cell groups S1.

Figure 16:
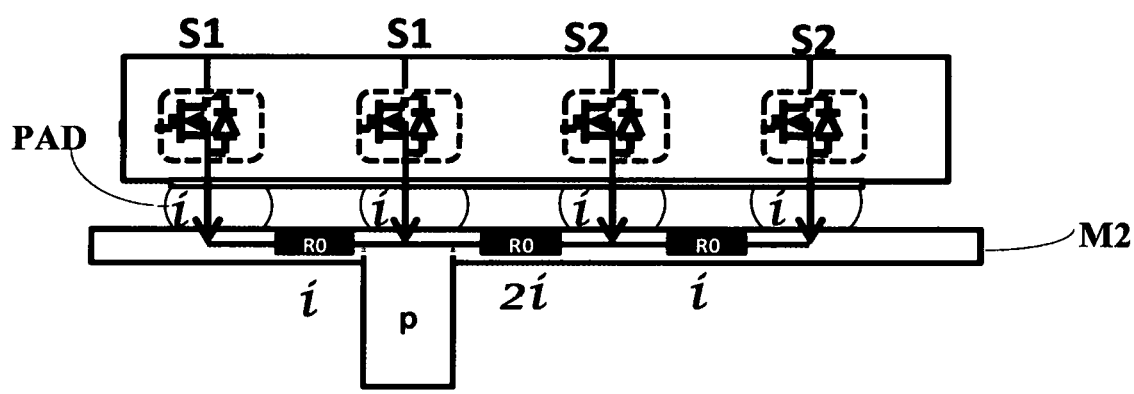
FIG. 16 schematically illustrates an external pin disposed near a central position of a power chip inside a power chip operated in the same phase.

As shown in FIG. 16, the external pin of the power device operated in the same phase is near the central position of the power chip. FIG. 16 differs from FIG. 15 in that the external pin p is disposed at the second one of the first cell groups S1.

The losses of the second metal layer M2 in one cycle respectively in the above embodiments are compared as shown in the following Table 1. Although it is assumed in the embodiments of the present disclosure that D is less than 50% and phase difference between S1 and S2 is 180° for the simplicity of calculation and ease of comparison, the same conclusions hold even if D is equal to or greater than 50% or phase difference is other than 180°.

TABLE 1

| FIGS. 11(a) and 11(b) | FIG. 12(a) and 12(b) | FIG. 13(a) and 13(b) | FIG. 14(a) and 14(b) | FIG. 15 | FIG. 16 |
| --- | --- | --- | --- | --- | --- |
| $10i^2R0 \times D$ | $6i^2R0 \times D$ | $8i^2R0 \times D$ | $4i^2R0 \times D$ | $14i^2R0 \times D$ | $6i^2R0 \times D$ |

It can be seen that, regardless whether the position of the pin is near the central position or near the edge position, the power device operated in alternatingly-switched mode is advantageous in reducing the loss of the package metal layer, in order to maximize the utilization of the metal, it is preferred to dispose the pin of the power package operated in alternatingly-switched mode or the position of the metal PAD close to the center of the power chip. Moreover, it may be more advantageous for improving the utilization of the metal layer that the first cell group S1 and the second cell group S2 which are operated in alternatingly-switched mode are arranged alternatingly, compared with arranging the first cell group S1 and the second cell group S2 in respective regions.

Figure 30:
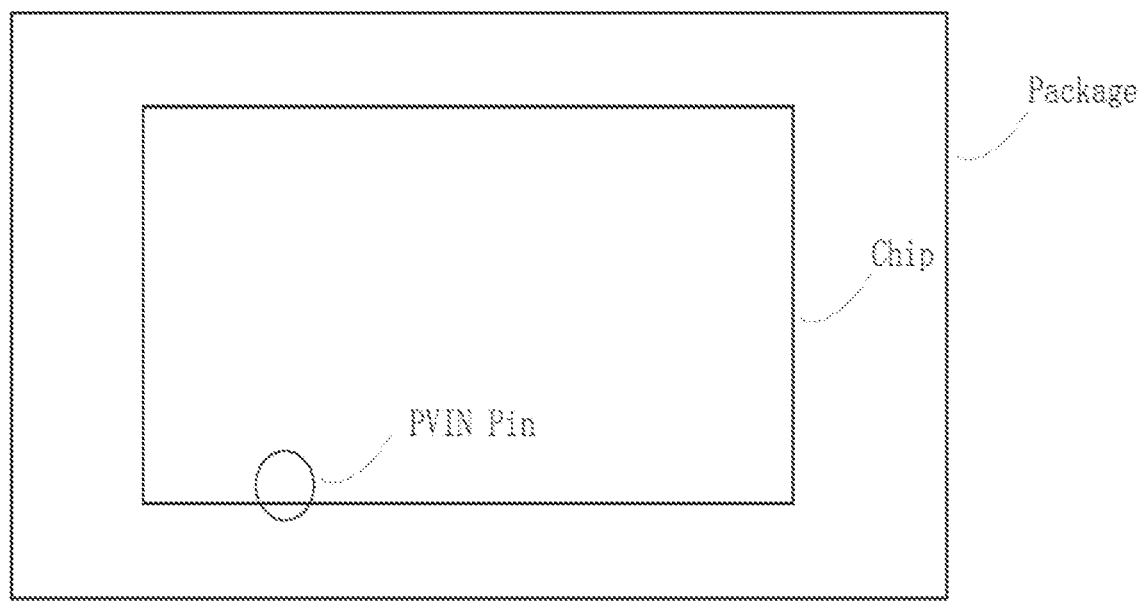
FIG. 30 schematically illustrates the top view of an integrated power package with a power chip and a PVIN pin, with the geometric center of the PVIN pin overlapping the surface of the chip.

In the embodiments of the present disclosure, as shown in FIG. 30, the geometric center of one of the pins with the same reference (such as PVIN) or the geometric center of one of the metal PADs with the same reference is overlapping with the surface of the chip, when viewed from top view or bottom view of the chip, to reduce the distance between the pin and the center of the chip. That is, the outline of the pin or pad is projected to the plane containing the surface of the chip. In a direction perpendicular to the surface of the chip, and the geometric center of the projection of such pin or pad may be located within the area of the surface of the chip (as shown in FIG. 30). Alternatively, it means that the distance between the geometric center of one of the pins with the same reference and the geometric center of the surface of the chip is less than half of the width or length of the chip. For the power chip operated in alternatingly-switched mode according to the embodiments of the present disclosure, "arranged alternatingly" means that the cells in different cell groups in the power chip operated in alternatingly-switched mode are arranged alternatingly, that is, a distance between the geometric centers of cell groups of any two ordinal numbers is less than half of the width of the chip.

Figure 17:
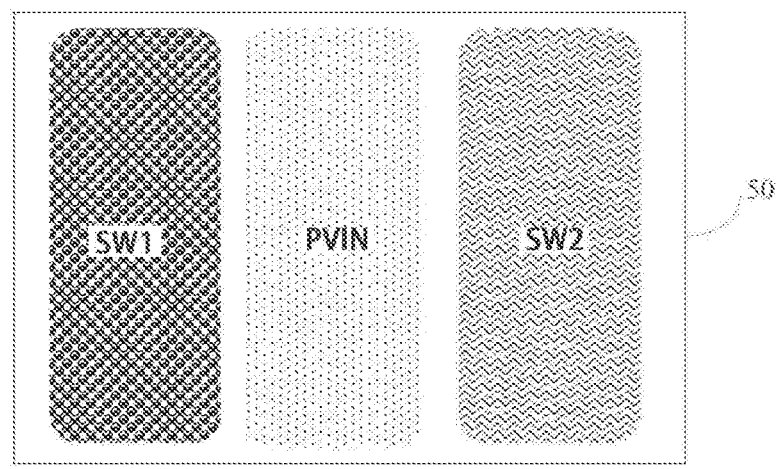
FIG. 17 schematically illustrates distribution of external pins of a power package operated in alternatingly-switched mode as shown in FIG. 4.
Figure 18:
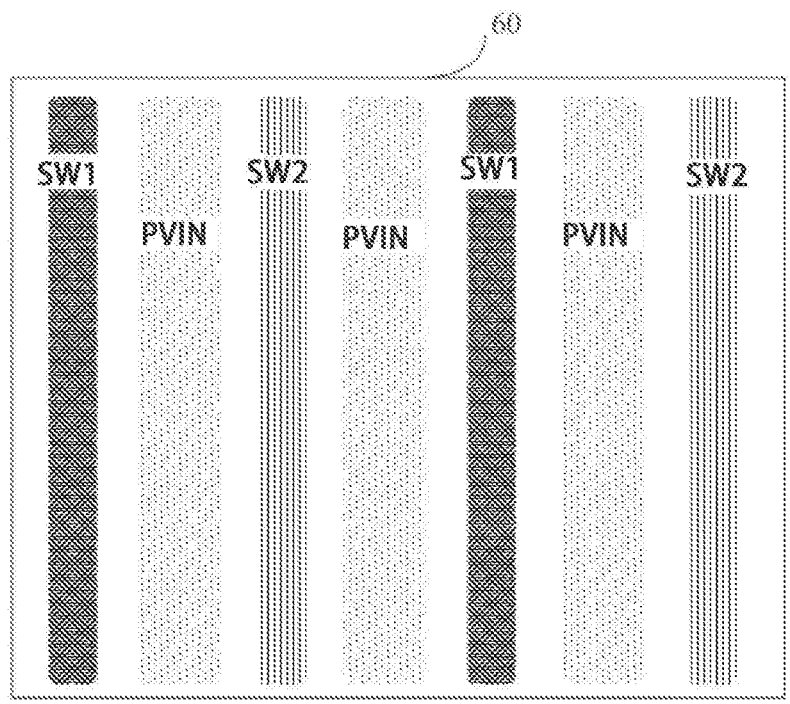
FIG. 18 schematically illustrates another distribution of external pins of a power package operated in alternatingly-switched mode as shown in FIG. 4.

The leading out position of the package pin or the position of the metal PAD on the surface of the chip is required to be defined at the near-central position of the chip based on the above discussion. The distribution of the external pins of the power package or the metal PADs of the power chip operated in alternatingly-switched mode of FIG. 4 may be shown in FIG. 17. The first electrode PVIN is led out at the central position of the power package or power chip, and the surface of the first electrode PVIN is overlapped with the geometric center of surface of the chip. In FIG. 17, a reference number 50 represents an edge of the power package or the power chip. As shown in FIG. 18, different pins or metal PADs are evenly distributed on the surface of the power package or the power chip. The geometric center of all of the pins or metal PADs is closer to the central position of the surface of the chip, thereby improving the utilization of the metals in the whole and reducing metal conduction loss for the chip and for the package of the chip. In FIG. 18, a reference number 60 represents an edge of the power package or the power chip.

Figure 19:
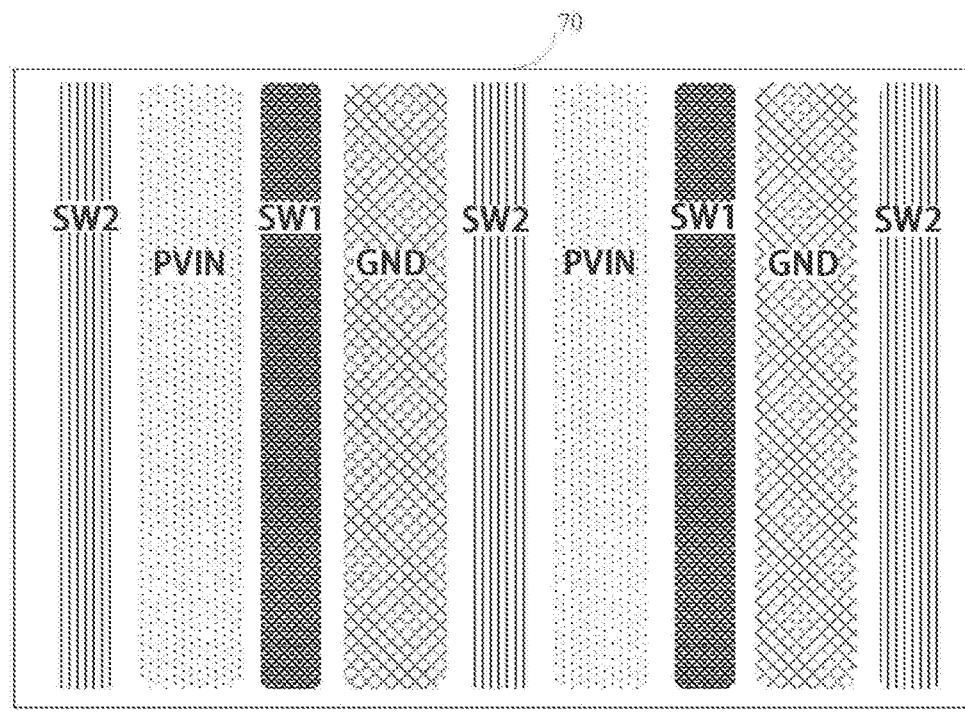
FIG. 19 schematically illustrates a first distribution of external pins of a power package operated in alternatingly-switched mode as shown in FIG. 6.

In a practical design of the power chip operated in alternatingly-switched mode, in addition to the design of defining one power chip as a plurality of upper bridge-arm switches Q1 and Q2 as shown in FIG. 4, one power chip may also be defined as a plurality of lower bridge-arm switches Q3 and Q4, and may even be defined as a plurality of upper bridge-arm switches Q1 and Q2 and a plurality of lower bridge-arm switches Q3 and Q4. The above discussed design method and principle are all applicable. As shown in FIG. 19, Q1, Q2, Q3 and Q4 are defined in the same power chip operated in alternatingly-switched mode. The power chip requires more different pins or metal PADs. However, the pins and the metal PADs are still arranged symmetrically close to the center. In FIG. 19, a reference number 70 represents an edge of the power package or the power chip.

Figure 20:
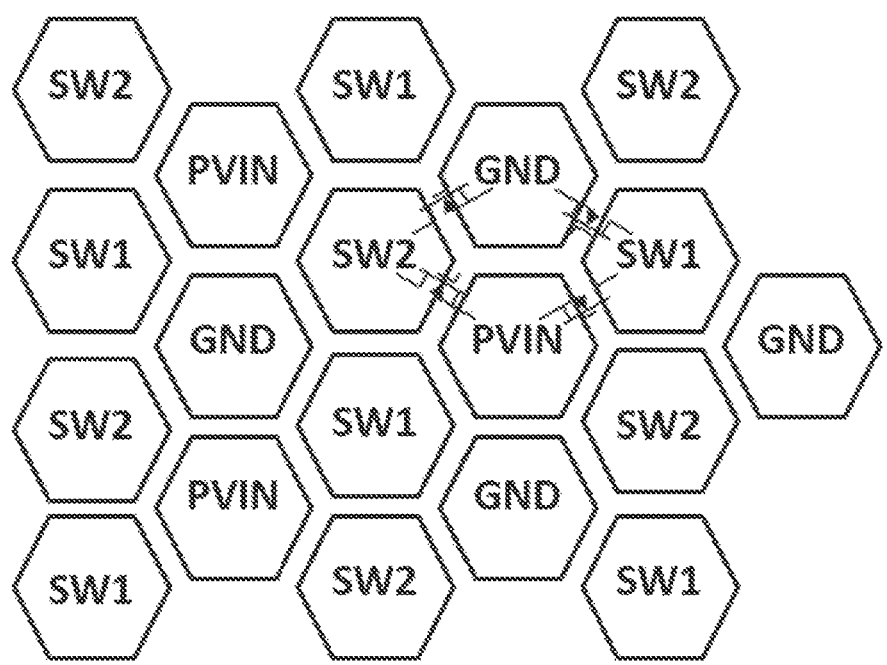
FIG. 20 schematically illustrates a second distribution of external pins of a power package operated in alternatingly-switched mode as shown in FIG. 6.
Figure 21:
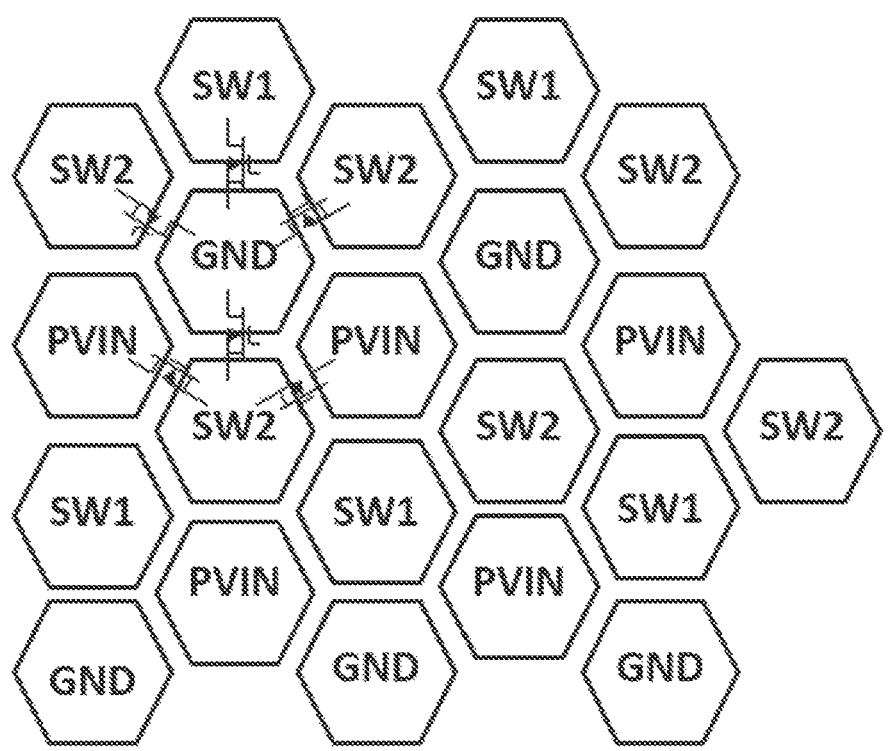
FIG. 21 schematically illustrates a third distribution of external pins of a power package operated in alternatingly-switched mode as shown in FIG. 6.

FIG. 20 schematically shows a second distribution of the external pins of the power package or the metal PADs of the power chip operated in alternatingly-switched mode as shown in FIG. 6. FIG. 21 schematically shows a third distribution of the external pins of the power package or the metal PADs of the power chip operated in alternatingly-switched node as shown in FIG. 6. In FIGS. 20 and 21, the shapes of the electrodes are shown in hexagons for example. Along a particular direction of a hexagon, the first electrode PVIN and the second electrode GND are distributed alternatingly and the third electrode SW1 and the fourth electrode SW2 are distributed, alternatingly.

As discussed above, in addition to improving the utilization of the metal layer of the chip itself, since the chip is operated in alternatingly-switched mode in this fundamental structure, the conduction loss by the package metal, the pin metal of the device and the metal of the system board apart from the chip could also benefit from near-continuously conducted current. Therefore, by designing a fundamental structure of the chip that operates in alternatingly-switched mode, utilization of the metal interconnection resources at the overall system level may be directly improved.

Figure 22:
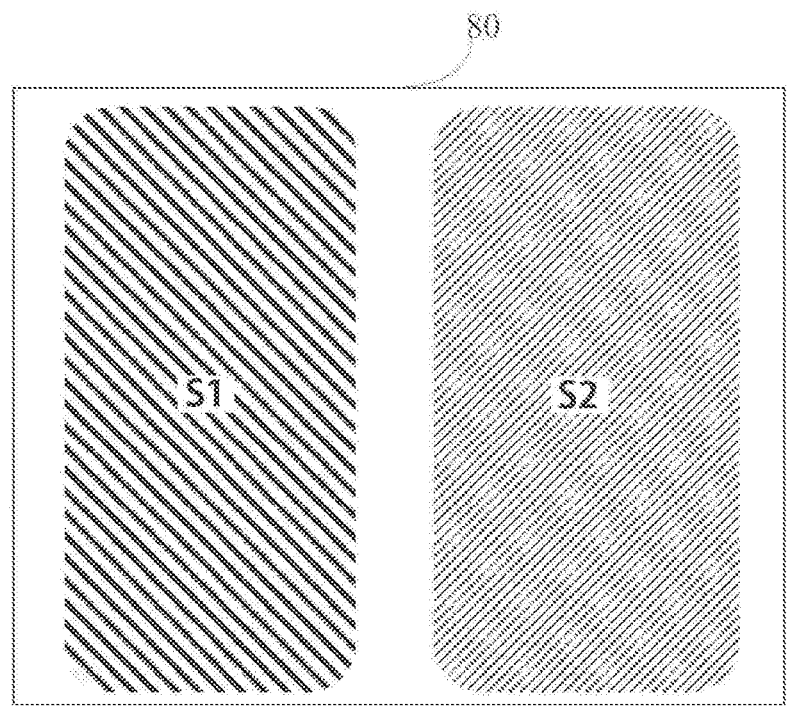
FIG. 22 schematically illustrates two cell groups disposed in respective regions inside a power chip operated in alternatingly-switched mode.
Figure 23:
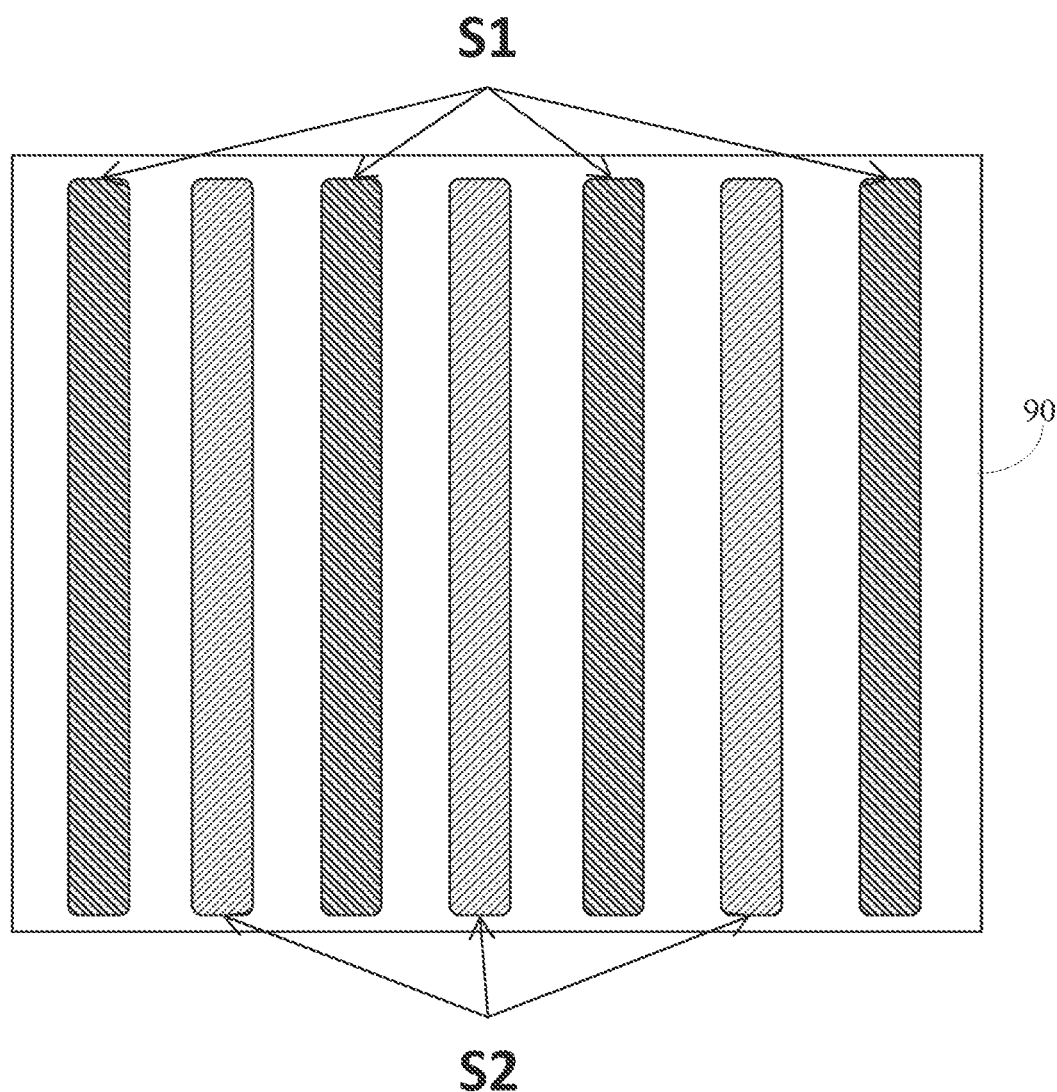
FIG. 23 schematically illustrates two strip-shaped cell groups arranged alternatingly and in parallel along a lateral direction inside a power chip operated in alternatingly-switched mode.
Figure 24:
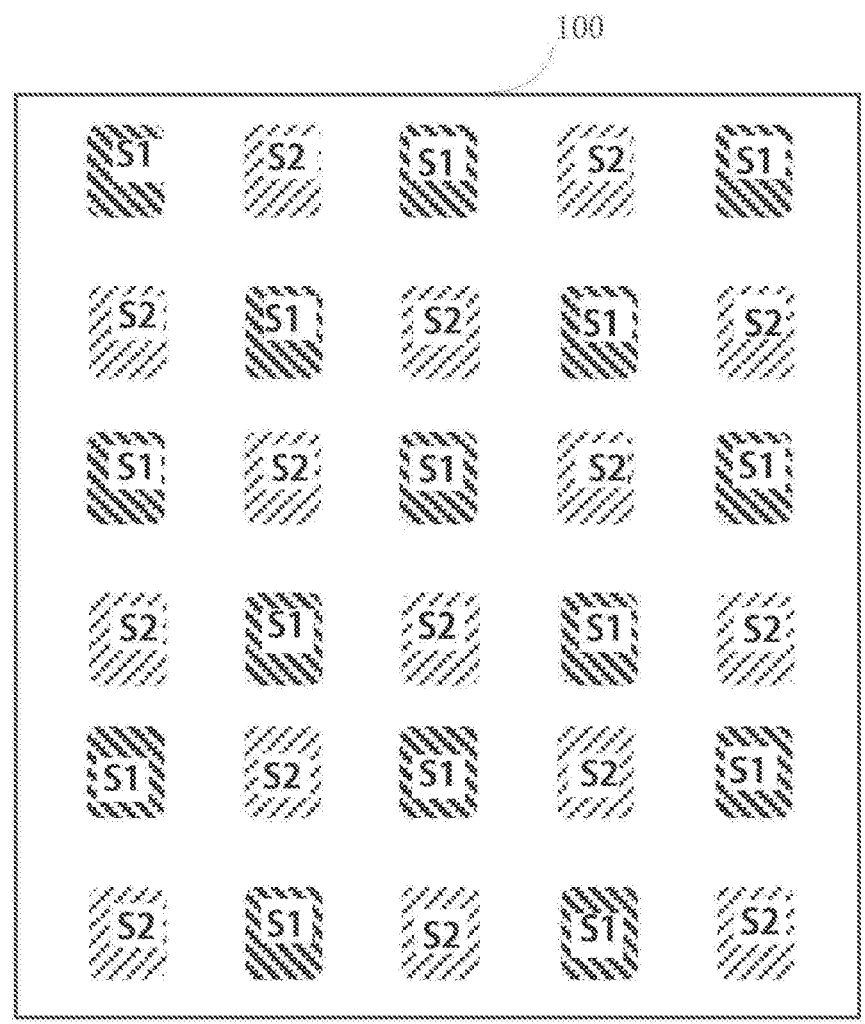
FIG. 24 schematically illustrates two polygon-shaped cell groups arranged alternatingly inside a power chip operated in alternatingly-switched mode.

FIGS. 22-24 illustrate different distribution of the chip.

In an exemplary embodiment, a first cell group or a plurality of first cell groups S1 are disposed in a first region of a chip 20, and a second cell group or a plurality of second cell groups S2 are disposed in a second region of a chip 20.

As shown in FIG. 22, two cell groups S1 and S2 inside a power chip are respectively disposed in a first region and a second region. In FIG. 22, a reference number 80 represents an edge of the power chip.

As shown in FIG. 23, cell groups S1 and cell groups S2 are arranged alternatingly in lateral direction, and disposed in parallel. The first region which contains cell groups S1 includes a plurality of first sub-regions, and the second region which contains cell groups S2 includes a plurality of second sub-regions. Each of the first sub-regions and the second sub-regions is in a strip shape. The plurality of first sub-regions and the plurality of second sub-regions are arranged alternatingly and disposed in parallel. The cells on the chip are disposed in different regions, and each sub-electrode leading out of each cell has a shape corresponding to the shape of a respective region. In FIG. 23, a reference number 90 represents an edge of the power chip As shown in FIG. 24, different cell groups are distributed alternatingly and each of the cell groups is in a polygon. In this case, the cell groups on the chip operated in alternatingly-switched mode are arranged alternatingly not only in the lateral direction but also in other directions. The first region includes a plurality of first sub-regions, and the second region includes a plurality of second sub-regions. Each of the first sub-regions and the second sub-regions is in a polygon shape. The plurality of first sub-regions and plurality of second sub-regions are arranged alternatingly. Although FIG. 24 only shows cell groups each in a quadrilateral shape, in practice, the shape of the cell group may be any polygon, such as pentagon, hexagon, and so on. In FIG. 24, a reference number 100 represents an edge of the power chip.

The above power chip operated in alternatingly-switched mode may be applied to almost any existing circuit topology which allows operation in alternatingly-switched mode or interleaved mode, such as any of a BUCK circuit, a BOOST circuit or a Totem-Pole circuit, a Full-Bridge circuit, and a Buck-Boost circuit.

Figure 25:
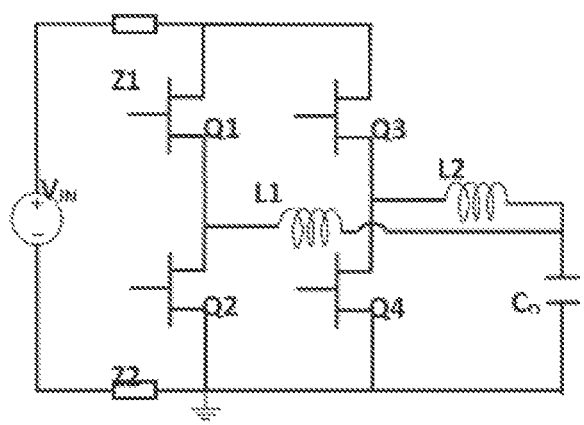
FIG. 25 schematically illustrates a BUCK circuit in which an alternatingly switched parallel circuit according to the embodiments of the present disclosure is applied.

FIG. 25 schematically illustrates a BUCK circuit in which an alternatingly-switched parallel circuit according to the embodiments of the present disclosure is applied. The BUCK circuit, i.e. buck chopper circuit is one of a basic DC-DC circuit, generally used for DC to DC step-down conversion The BUCK circuit is a single-tube non-isolated DC to DC converter with an output voltage lower than the input voltage, also known as a buck converter.

As shown in FIG. 25, the BUCK circuit includes a first bridge arm and a second bridge arm which are switched on alternatingly and connected in parallel. The first bridge arm includes a first upper bridge-arm switch Q1 and a first lower bridge-arm switch Q2. The second bridge arm includes a second upper bridge-arm switch Q3 and a second lower bridge-arm switch Q4. A first terminal of the first upper bridge-arm switch Q1 of the first bridge arm and a first terminal of the second upper bridge-arm switch Q3 of the second bridge arm are electrically connected to a power source $V_{IN}$. A second terminal of the first lower bridge-arm switch Q2 of the first bridge arm and a second terminal of the second lower bridge-arm switch Q4 of the second bridge arm are electrically connected to ground. The BUCK circuit also includes stray parameters Z1 and Z2. In an embodiment, the BUCK circuit also includes a first inductor L1 and a second inductor L2. The first inductor L1 is electrically connected to a second terminal of the first upper bridge-arm switch Q1 and a first terminal of the first lower bridge-arm switch Q2. The second inductor L2 is electrically connected to a second terminal of the second upper bridge-arm switch Q3 and a first terminal of the second lower bridge-arm switch Q4. A second terminal of the first inductor L1 and a second terminal of the second inductor L2 are electrically connected to a load capacitor $C_O$. In the embodiment, Q1-Q4 are switches generally driven by a Pulse Width Modulation (PWM) signal.

Figure 26:
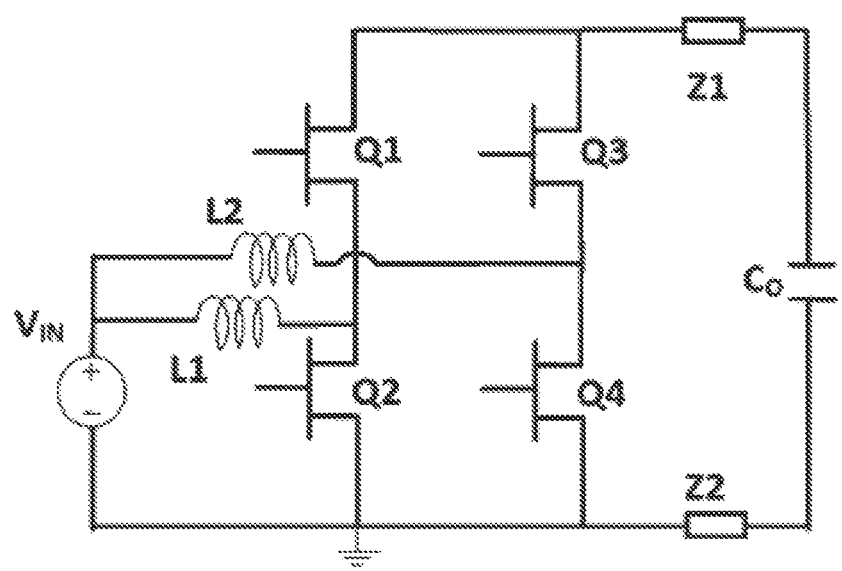
FIG. 26 schematically illustrates a BOOST circuit in which an alternatingly-switched parallel circuit according to the embodiments of the present disclosure is applied.

FIG. 26 schematically illustrates a BOOST circuit in which an alternatingly-switched parallel circuit according to the embodiments of the present disclosure is applied. The BOOST circuit is a DC to DC converter with an output voltage higher than the input voltage, also known as a boost converter.

As shown in FIG. 26, the BOOST circuit includes a first bridge arm and a second bridge arm which are switched on alternatingly and connected in parallel. The first bridge arm includes a first upper bridge-arm switch Q1 and a first lower bridge-arm switch Q2. The second bridge arm includes a second upper bridge-arm switch Q3 and a second lower bridge-arm switch Q4. A second terminal of the first upper bridge-arm switch Q1 of the first bridge arm and a first terminal of the first lower bridge-arm switch Q2 of the first bridge arm are electrically connected to a power source $V_{IN}$ through a first inductor L1. A second terminal of the second upper bridge-arm switch Q3 of the second bridge arm and a first terminal of the second lower bridge-arm switch Q4 of the second bridge arm are electrically connected to the power source $V_{IN}$ through a second inductor L2. A second terminal of the first lower bridge-arm switch Q2 of the first bridge arm and a second terminal of the second lower bridge-arm switch Q4 of the second bridge arm are connected to ground. The BOOST circuit also includes stray parameters Z1 and Z2. The first terminal of the first upper bridge-arm switch Q1 and the first terminal of the second upper bridge-arm switch Q3 are electrically connected to a first terminal of a load capacitor $C_O$ through the stray parameter Z1. The second terminal of the first lower bridge-arm switch Q2 and the second terminal of the second lower bridge-arm switch Q4 are electrically connected to a second terminal of the load capacitor $C_O$ through the stray parameter Z2. In the embodiment, Q1-Q4 are switches generally driven by a Pulse Width Modulation (PWM) signal. The duty cycle of Q1-Q4 is restricted to less than 1, and they are not allowed to operate with a duty cycle of 1. The first inductor L1 and the second inductor L2 are at the input side and referred to as boost inductors.

Figure 27:
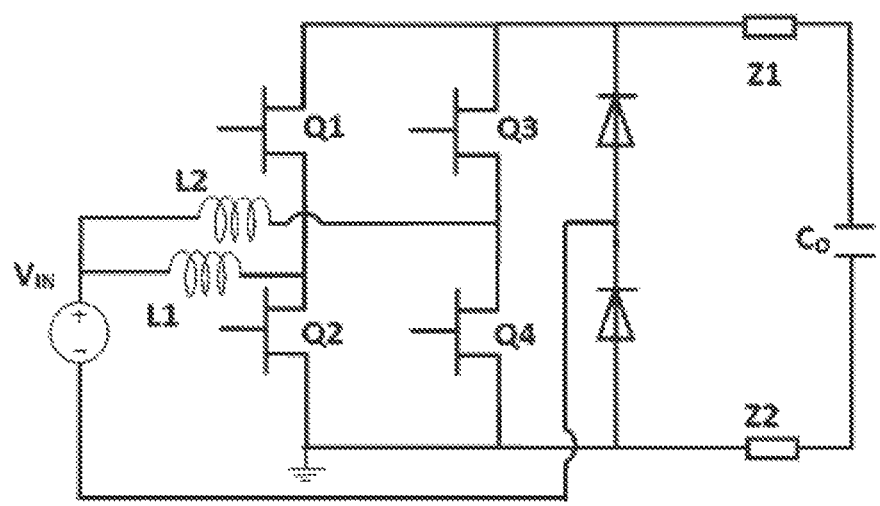
FIG. 27 schematically illustrates a Totem-Pole circuit in which an alternatingly-switched parallel circuit according to the embodiments of the present disclosure is applied.

FIG. 27 schematically illustrates a Totem-Pole circuit in which an alternatingly-switched parallel circuit according to the embodiments of the present disclosure is applied.

As shown in FIG. 27, the Totem-Pole circuit includes a first bridge arm and a second bridge arm which are switched on alternatingly and connected in parallel. The first bridge arm includes a first upper bridge-arm switch Q1 and a first lower bridge-arm switch Q2. The second bridge arm includes a second upper bridge-arm switch Q3 and a second lower bridge-arm switch Q4. A second terminal of the first upper bridge-arm switch Q1 of the first bridge arm and a first terminal of the first lower bridge-arm switch Q2 of the first bridge arm are electrically connected to a first terminal of a power source $V_{IN}$ through a first inductor L1. A second terminal of the second upper bridge-arm switch Q3 of the second bridge arm and a first terminal of the second lower bridge-arm switch Q4 of the second bridge arm are electrically connected to the first terminal of the power source $V_{IN}$ through a second inductor L2. A second terminal of the first lower bridge-arm switch Q2 of the first bridge arm and a second terminal of the second lower bridge-arm switch Q4 of the second bridge arm are connected to ground. The Totem-Pole circuit also includes a first diode D1 and a second diode D2 connected in series. The branch of the first diode D1 and the second diode D2 is connected to the first bridge arm and the second bridge arm in parallel. The anode of the first diode D1 is electrically connected to the cathode of the second diode D2. The cathode of the first diode D1 is electrically connected to a first terminal of the first bridge arm and the second bridge arm. The second terminal of the second diode D2 is connected to ground. In the embodiment, the anode of the first diode D1 and the cathode of the second diode D2 are electrically connected to a second terminal of the power source $V_{IN}$. The Totem-Pole circuit also includes stray parameters Z1 and Z2. The first terminal of the first upper bridge-arm switch Q1 and the first terminal of the second upper bridge-arm switch Q3 are electrically connected to a first terminal of a load capacitor $C_O$ through the parameter Z1. The second terminal of the first lower bridge-arm switch Q2 and the second terminal of the second lower bridge-arm switch Q4 are electrically connected to a second, terminal of the load capacitor $C_O$ through the parameter Z2

Figure 28:
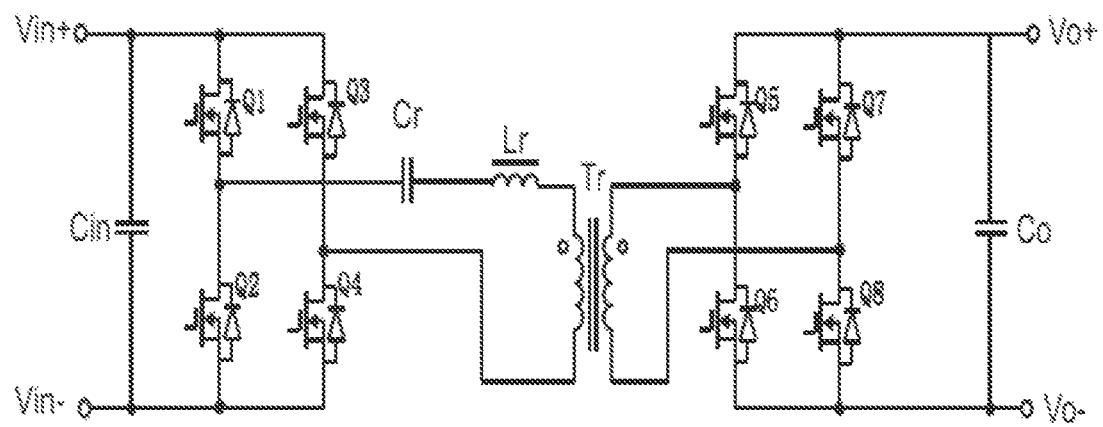
FIG. 28 schematically illustrates a Full-Bridge circuit in which an alternatingly-switched parallel circuit according to the embodiments of the present disclosure is applied.

A Full-Bridge circuit is a circuit wherein a first bridge arm and a second bridge arm are connected in parallel and a passive device (such as a capacitor, an inductor, or a transformer) or a plurality of passive devices are connected to the mid-terminals of the first bridge arm and the second bridge arm. FIG. 28 shows one example of the Full-Bridge circuit. As shown in FIG. 28, the primary side of Full-Bridge circuit includes a first bridge arm and a second bridge arm which are switched on alternatingly and connected in parallel. The first bridge arm includes a first upper bridge-arm switch Q1 and a first lower bridge-arm switch Q2. The second bridge arm includes a second upper bridge-arm switch Q3 and a second lower bridge-arm switch Q4. A first terminal of the first upper bridge-arm switch Q1 of the first bridge arm and a first terminal of the second upper bridge-arm switch Q3 of the second bridge arm are electrically connected to a power source $V_{IN}$. A second terminal of the first lower bridge-arm switch Q2 of the first bridge arm and a second terminal of the second lower bridge-arm switch Q4 of the second bridge arm are electrically connected to $V_{IN}$. Also as shown in FIG. 28, the secondary side of Full-Bridge circuit may include a third bridge arm and a fourth bridge arm which are switched on alternatingly and connected in parallel. The third bridge arm includes a third upper bridge-arm switch Q5 and a third lower bridge-arm switch Q6. The fourth bridge arm includes a fourth upper bridge-arm switch Q7 and a fourth lower bridge-arm switch Q8. A first terminal of the third upper bridge-arm switch Q5 of the third bridge arm and a first terminal of the fourth upper bridge-arm switch Q7 of the fourth bridge arm are electrically connected to the positive terminal of the load $V_O+$. A second terminal of the third lower bridge-arm switch Q6 of the third bridge arm and a second terminal of the fourth lower bridge-arm switch Q8 of the fourth bridge arm are electrically connected to the negative terminal of the load $V_O-$. In an embodiment, the Full-Bridge circuit also includes a magnetic component, such as a transformer Tr. The primary side of the transformer Tr is connected in series with an inductor Lr and a capacitor Cr. A first terminal of the capacitor Cr is electrically connected to a second terminal of the first upper bridge-arm switch Q1 and a first terminal of the first lower bridge-arm switch Q2 (as the mid-terminal of the first bridge arm). A second terminal of the primary side of the transformer Tr is connected to a second terminal of the second upper bridge-arm switch Q3 and a first terminal of the second lower bridge-arm switch Q4 (as the mid-terminal of the second bridge arm). A first terminal of the secondary side of the transformer Tr is electrically connected to a second terminal of the third upper bridge-arm switch Q5 and a first terminal of third first lower bridge-arm switch Q6 (as the mid-terminal of the third bridge arm). A second terminal of the secondary side of the transformer Tr is electrically connected to a second terminal of the fourth upper bridge-arm switch Q7 and a first terminal of the fourth lower bridge-arm switch Q8 (as the mid-terminal of the fourth bridge arm). In the embodiment, Q1-Q8 are switches generally driven by a Pulse Width Modulation (PWM) signal. In FIG. 28, the full-bridges are provided in both primary and secondary sides, wherein the first bridge arm and the second bridge arm form the first full-bridge and the third bridge arm and the fourth bridge arm form the second full bridge, that is to say, the circuit in FIG. 28 has two "full-bridges". While in some cases, a circuit may have one "full-bridge", such as a circuit having a full-bridge in its primary side and a full-wave rectifier in its secondary side. And this kind of circuit is also one example of "Full-Bridge circuit".

Figure 29:
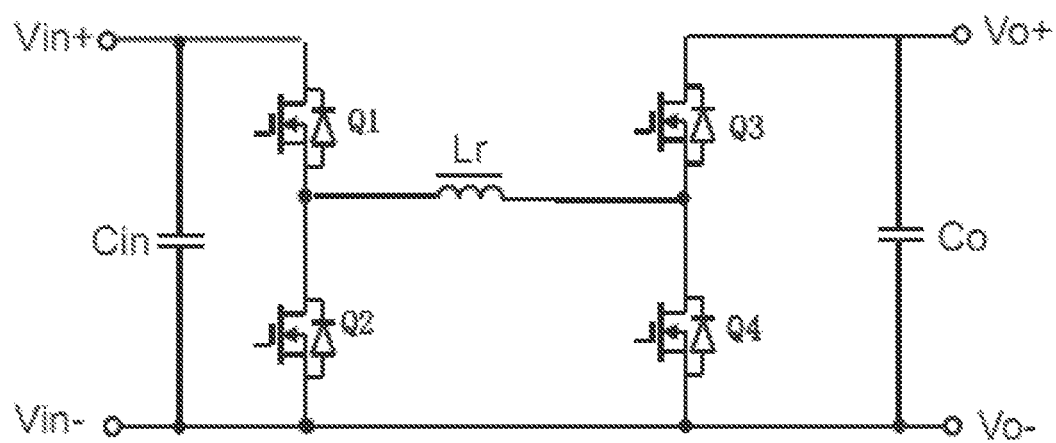
FIG. 29 schematically illustrates a Buck-Boost circuit in which an alternatingly-switched parallel circuit according to the embodiments of the present disclosure is applied.

As shown in FIG. 29, a Buck-Boost circuit includes a first bridge arm and a second bridge arm which are switched on alternatingly. The first bridge arm includes a first upper bridge-arm switch Q1 and a first lower bridge-arm switch Q2. The second bridge arm includes a second upper bridge-arm switch Q3 and a second lower bridge-arm switch Q4. A first terminal of the first upper bridge-arm switch Q1 of the first bridge arm is electrically connected to a power source Vin+. A first terminal of the second upper bridge-arm switch Q3 of the second bridge arm is electrically connected to a load Vo+. A second terminal of the first lower bridge-arm switch Q2 of the first bridge arm is electrically connected to a power source Vin−, and a second terminal of the second lower bridge-arm switch Q4 of the second bridge arm is electrically connected to a load Vo−. In an embodiment, the Buck-Boost circuit also includes a magnetic component, such as an inductor Lr. A first terminal of the inductor Lr is electrically connected to a second terminal of the first upper bridge-arm switch Q1 and a first terminal of the first lower bridge-arm switch Q2. A second terminal of the inductor Lr is electrically connected to a second terminal of the second upper bridge-arm switch Q3 and a first terminal of the second lower bridge-arm switch Q4. That is to say, the inductor Lr is connected to the mid-terminals of the first bridge arm and the second bridge arm. In the embodiment, Q1-Q4 are switches generally driven by a Pulse Width Modulation (PWM) signal.

Accordingly, in the alternatingly-switched parallel circuit, integrated power module and the integrated power package of the present disclosure, by defining and designing an integrated chip operated in alternatingly-switched mode, and disposing a plurality of half bridges inside a single power chip, utilization of the interconnection conduction paths such as the metal layers inside the chip, in the package and in the system board can be significantly improved when the power chip is operated in alternatingly-switched mode, and the unevenness of theses metal conductors due to the switch operation mode can be effectively reduced. The loss of the conduction paths can be significantly reduced and it facilitates reducing the volume of the power module which contains the chip and improving its efficiency.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

What is claimed is:

1. An alternatingly-switched parallel circuit comprising a first bridge arm and a second bridge arm, wherein
the first bridge arm comprises:
   a first upper bridge-arm switch comprising a first terminal, a second terminal and a control terminal; and
   a first lower bridge-arm switch comprising a first terminal, a second terminal and a control terminal;
   wherein the second terminal of the first upper bridge-arm switch is electrically connected to the first terminal of the first lower bridge-arm switch;
the second bridge arm comprises:
   a second upper bridge-arm switch comprising a first terminal, a second terminal and a control terminal; and
   a second lower bridge-arm switch comprising a first terminal, a second terminal and a control terminal;
   wherein the first bridge arm is connected in parallel with the second bridge arm, and the second terminal of the second upper bridge-arm switch is electrically connected to the first terminal of the second lower bridge-arm switch;
   wherein the first bridge arm and the second bridge arm are at least partly formed in a chip including a plurality of first cell groups and a plurality of second cell groups;
   wherein the plurality of first cell groups are configured to form one of the first upper bridge-arm switch of the first bridge arm and the first lower bridge-arm switch of the first bridge arm, and the plurality of second cell groups are configured to form one of the second upper bridge-arm switch of the second bridge arm and the second lower bridge-arm switch of the second bridge arm; and
   the plurality of first cell groups and the plurality of second cell groups are switched on and off alternatingly;
   wherein the plurality of first cell groups are disposed in a first region of the chip, and the plurality of second cell groups are disposed in a second region of the chip;
   wherein the first region contains a plurality of first sub-regions, and the second region contains a plurality of second sub-regions, and the first sub-regions and the second sub-regions are arranged alternatingly.

2. The alternatingly-switched parallel circuit according to claim 1, wherein the plurality of first cell groups are configured to form the first upper bridge-arm switch of the first bridge arm and the plurality of second cell groups are configured to form the second upper bridge-arm switch of the second bridge arm.

3. The alternatingly-switched parallel circuit according to claim 1, wherein the plurality of first cell groups are configured to form the first lower bridge-arm switch of the first bridge arm and the plurality of second cell groups are configured to form the second lower bridge-arm switch of the second bridge arm.

4. The alternatingly-switched parallel circuit according to claim 1, further comprising:
   a first inductor comprising a first terminal and a second terminal, the first terminal of the first inductor being electrically connected to the second terminal of the first upper bridge-arm switch and the first terminal of the first lower bridge-arm switch; and
   a second inductor comprising a first terminal and a second terminal, the first terminal of the second inductor being electrically connected to the second terminal of the second upper bridge-arm switch and the first terminal of the second lower bridge-arm switch;
   wherein the second terminal of the first inductor is electrically connected to the second terminal of the second inductor.

5. The alternatingly-switched parallel circuit according to claim 1, wherein the plurality of first cell groups and the plurality of second cell groups are switched on and off in the interleaved mode with a phase difference of 180 degrees, 120 degrees or 90 degrees.

6. The alternatingly-switched parallel circuit according to claim 1, wherein the plurality of first cell groups have a plurality of first external pins, the plurality of second cell groups have a plurality of second external pins, a geometric center of at least one of the first external pins and the second external pins overlaps with a surface of the chip.

7. The alternatingly-switched parallel circuit according to claim 1, wherein each of the first sub-regions and the second sub-regions is in a stripe shape, or each of the first sub-regions and the second sub-regions is in a polygon shape.

8. The alternatingly-switched parallel circuit according to claim 1, wherein the alternatingly-switched parallel circuit is a BUCK circuit, a BOOST circuit, a Totem-Pole circuit, a BUCK-BOOST circuit or a full-bridge circuit.

9. An integrated power module, which is applied in an alternatingly-switched parallel circuit comprising a first bridge arm and a second bridge arm, wherein
   the first bridge arm comprises:
      a first upper bridge-arm switch comprising a first terminal, a second terminal and a control terminal; and
      a first lower bridge-arm switch comprising a first terminal, a second terminal and a control terminal;
      a first electrode electrically connected to the first terminal of the first upper bridge-arm switch;
      a second electrode electrically connected to the second terminal of the first lower bridge-arm switch; and
      a third electrode electrically connected to the second terminal of the first upper bridge-arm switch and the first terminal of the first lower bridge-arm switch;
   the second bridge arm comprises:
      a second upper bridge-arm switch comprising a first terminal, a second terminal and a control terminal, the first electrode being electrically connected to the first terminal of the second upper bridge-arm switch;
      a second lower bridge-arm switch comprising a first terminal, a second terminal and a control terminal, the second electrode being electrically connected to the second terminal of the second lower bridge-arm switch; and
      a fourth electrode electrically connected to the second terminal of the second upper bridge-arm switch and the first terminal of the second lower bridge-arm switch;
   the integrated power module further comprises:
      a first inductor comprising a first terminal and a second terminal, the first terminal of the first inductor being electrically connected to the third electrode; and
      a second inductor comprising a first terminal and a second terminal, the first terminal of the second inductor being electrically connected to the fourth electrode;
   wherein one of the first upper bridge-arm switch of the first bridge arm and the first lower bridge-arm switch of the first bridge arm and one of the second upper bridge-arm switch of the second bridge arm and the second lower bridge-arm switch of the second bridge arm are formed in a chip, and the chip includes a plurality of first cell groups and a plurality of second cell groups;
   wherein the plurality of first cell groups and the plurality of second cell groups are switched on and off alternatingly;
   wherein the plurality of first cell groups are disposed in a first region of the chip, and the plurality of second cell groups are disposed in a second region of the chip;
   wherein the first region contains a plurality of first sub-regions, and the second region contains a plurality of second sub-regions, and the first sub-regions and the second sub-regions are arranged alternatingly.

10. The integrated power module according to claim 9, wherein the first upper bridge-arm switch of the first bridge arm and the second upper bridge-arm switch of the second bridge arm are formed in the chip;
   wherein the plurality of first cell groups are configured to form the first upper bridge-arm switch of the first bridge arm, the plurality of second cell groups are configured to form the second upper bridge-arm switch of the second bridge arm.

11. The integrated power module according to claim 9, wherein the first lower bridge-arm switch of the first bridge arm and the second lower bridge-arm switch of the second bridge arm are formed in the chip;
   wherein the plurality of first cell groups are configured to form the first lower bridge-arm switch of the first bridge arm, the plurality of second cell groups are configured to form the second lower bridge-arm switch of the second bridge arm.

12. The integrated power module according to claim 9, wherein each of the first sub-regions and the second sub-regions is in a stripe shape, or each of the first sub-regions and the second sub-regions is in a polygon shape.

13. An integrated power package, which is applied in a power circuit comprising a first bridge arm and a second bridge arm, the first bridge arm comprising a first upper bridge-arm switch and a first lower bridge-arm switch, the second bridge arm comprising a second upper bridge-arm switch and a second lower bridge-arm switch,
   wherein the integrated power package comprises a first switch and a second switch, the first switch and second switch are formed in a chip, and the chip includes a plurality of first cell groups and a plurality of second cell groups;

wherein the first bridge arm is connected in parallel with the second bridge arm, the plurality of first cell groups are configured to form the first switch as one of the first upper bridge-arm switch of the first bridge arm and the first lower bridge-arm switch of the first bridge arm, and the plurality of second cell groups are configured to form the second switch as one of the second upper bridge-arm switch of the second bridge arm and the second lower bridge-arm switch of the second bridge arm; and the plurality of first cell groups and the plurality of second cell groups are switched on and off alternatingly;

wherein the plurality of first cell groups are disposed in a first region of the chip, and the plurality of second cell groups are disposed in a second region of the chip;

wherein the first region contains a plurality of first sub-regions, and the second region contains a plurality of second sub-regions, and the first sub-regions and the second sub-regions are arranged alternatingly.

14. The integrated power package according to claim 13, each of the first sub-regions and the second sub-regions is in a stripe shape, or each of the first sub-regions and the second sub-regions is in a polygon shape.

15. The integrated power package according to claim 13, wherein the power circuit further comprises a capacitor connected in parallel with the first bridge arm and the second bridge arm; wherein the capacitor is formed in the chip or package.

16. The integrated power package according to claim 13, wherein the plurality of first cell groups are configured to form the first upper bridge-arm switch of the first bridge arm, and the plurality of second cell groups are configured to form the second upper bridge-arm switch of the second bridge arm.

17. The integrated power package according to claim 16, further comprising a third switch and a fourth switch, wherein the third switch and the fourth switch are formed in the chip;

wherein the plurality of first cell groups are configured to form the first switch as the first upper bridge-arm switch of the first bridge arm, and the plurality of second cell groups are configured to form the second switch as the second upper bridge-arm switch of the second bridge arm;

wherein the third switch forms the first lower bridge-arm switch of the first bridge arm, and the fourth switch forms the second lower bridge-arm switch of the second bridge arm.

18. The integrated power package according to claim 17, wherein each of the first bridge arm and the second bridge arm has a mid-terminal and the power circuit further comprises a passive component electrically connected to the mid-terminal of the first bridge arm and the mid-terminal of the second bridge arm.

19. The integrated power package according to claim 13, wherein the plurality of first cell groups are configured to form the first lower bridge-arm switch of the first bridge arm, and the plurality of second cell groups are configured to form the second lower bridge-arm switch of the second bridge arm.

20. The integrated power package according to claim 13, wherein the plurality of first cell groups have a plurality of first external pins, the plurality of second cell groups have a plurality of second external pins, a geometric center of at least one of said first and second external pins overlaps with a surface of the chip.

* * * * *